(12) United States Patent
Hart et al.

(10) Patent No.: US 11,815,657 B2
(45) Date of Patent: Nov. 14, 2023

(54) LOW REFLECTANCE, ANTI-REFLECTIVE FILM STRUCTURES WITH CONTROLLED COLOR AND ARTICLES WITH THE SAME

(71) Applicant: Corning Incorporated, Corning, NY (US)

(72) Inventors: Shandon Dee Hart, Elmira, NY (US); Karl William Koch, III, Elmira, NY (US); Carlo Anthony Kosik Williams, Painted Post, NY (US); Lin Lin, Painted Post, NY (US); James Joseph Price, Corning, NY (US); Nicholas M Walker, Corning, NY (US)

(73) Assignee: Corning Incorporated, Corning, NY (US)

( * ) Notice: Subject to any disclaimer, the term of this patent is extended or adjusted under 35 U.S.C. 154(b) by 506 days.

(21) Appl. No.: 16/944,408

(22) Filed: Jul. 31, 2020

(65) Prior Publication Data
US 2021/0033751 A1    Feb. 4, 2021

Related U.S. Application Data

(60) Provisional application No. 62/881,045, filed on Jul. 31, 2019.

(51) Int. Cl.
*G02B 1/11*       (2015.01)
*G02B 1/115*      (2015.01)

(52) U.S. Cl.
CPC ............... *G02B 1/11* (2013.01); *G02B 1/115* (2013.01)

(58) Field of Classification Search
CPC .................................................... G02B 1/115
See application file for complete search history.

(56) References Cited

U.S. PATENT DOCUMENTS

| 8,312,739 B2 | 11/2012 | Lee et al. |
| 8,561,429 B2 | 10/2013 | Allan et al. |
| (Continued) | | |

FOREIGN PATENT DOCUMENTS

| JP | 2008-198453 A | 8/2008 |
| JP | 2013-224964 A | 10/2013 |
| (Continued) | | |

OTHER PUBLICATIONS

Dobrowolsk, J.A. (eds. Bass et al.). "Chapter 42: Optical Properties of Films and Coatings", Handbook of Optics, vol. I: Fundamentals, Techniques, and Design, (1995); p. 42.3-42.130.*

(Continued)

*Primary Examiner* — Prashant J Khatri
(74) *Attorney, Agent, or Firm* — William J. Tucker

(57) ABSTRACT

An article is described herein that includes: a translucent substrate having a major surface; and an anti-reflective coating disposed on the major surface and forming an anti-reflective surface. The article exhibits a single side average photopic light reflectance at the anti-reflective surface of less than 0.35%. Further, the article exhibits a single side color shift (ΔC) of less than 6 over an incident angle range from 0 degrees to 60 degrees incidence at the anti-reflective surface, wherein the anti-reflective coating comprises a physical thickness from about 50 nm to less than 500 nm. In addition, the anti-reflective coating comprises a plurality of layers that comprises at least one low refractive index layer and at least one high refractive index layer. Further, each high refractive index layer has a refractive index of greater than 2.0 and each low refractive index layer has a refractive index of less than 1.7.

22 Claims, 7 Drawing Sheets

(56) References Cited

U.S. PATENT DOCUMENTS

| | | | |
|---|---|---|---|
| 9,079,802 | B2 | 7/2015 | Bellman et al. |
| 9,335,444 | B2 | 5/2016 | Hart et al. |
| 9,359,261 | B2 | 6/2016 | Bellman et al. |
| 9,366,784 | B2 | 6/2016 | Bellman et al. |
| 9,411,180 | B2 | 8/2016 | Gollier et al. |
| 9,573,842 | B2 | 2/2017 | Gollier et al. |
| 9,701,579 | B2 | 7/2017 | Gollier et al. |
| 2014/0113083 | A1 | 4/2014 | Lee et al. |
| 2015/0322270 | A1 | 11/2015 | Amin et al. |
| 2015/0323705 | A1 | 11/2015 | Hart et al. |
| 2020/0057177 | A1 | 2/2020 | Koch et al. |
| 2020/0158916 | A1 | 5/2020 | Hart et al. |

FOREIGN PATENT DOCUMENTS

| | | | | |
|---|---|---|---|---|
| WO | 2015/085283 A1 | 6/2015 | | |
| WO | WO-2015171651 A1 | * 11/2015 | ......... | C23C 14/0605 |
| WO | 2016/118462 A2 | 7/2016 | | |

OTHER PUBLICATIONS

Charles Kittel, Introduction to Solid State Physics, seventh edition, John Wiley & Sons, Inc., NY, 1996, pp. 611-627.

Invitation to Pay Additional Fees; PCT/US2020/043360; dated Oct. 27, 2020; 9 Pages; European Patent Office.

James F. Shackelford, Introduction to Materials Science for Engineers, Sixth Edition, Pearson Prentice Hall, New Jersey, 2005, pp. 404-418.

Oliver et al., "An improved technique for determining hardness and elastic modulus using load and displacement sensing indentation experiments". J. Mater. Res., vol. 7, No. 6, 1992, pp. 1564-1583.

Oliver, W.C. and Pharr, G.M, "Measurement of Hardness and Elastic Modulus by Instrument Indentation: Advances in Understanding and Refinements to Methodology", J. Mater. Res., vol. 19, No. 1, 2004, 3-20.

Smart and Moore, Solid State Chemistry, An introduction, Chapman & Hall University and Professional Division, London, 1992, pp. 136-151.

Southwell, William, "Coating design using very thin high and low-index layers," Applied Optics, vol. 24, Issue 4, pp. 457, (1985).

* cited by examiner

LOW REFLECTANCE, ANTI-REFLECTIVE FILM STRUCTURES WITH CONTROLLED COLOR AND ARTICLES WITH THE SAME

CLAIM OF PRIORITY

This application claims the benefit of priority under 35 U.S.C. § 119 of U.S. Provisional Application No. 62/881,045, filed on Jul. 31, 2019, the content of which is incorporated herein by reference in its entirety.

BACKGROUND

The disclosure relates to low reflectance, anti-reflective structures with controlled color and articles having such structures, including such articles and structures with low average visible reflectance and controlled color over a range of viewing angles, along with high mechanical durability.

Cover articles are often used to protect devices within electronic products, to provide a user interface for input and/or display, and/or for many other functions. Such products include mobile devices, for example smart phones, smart watches, mp3 players and computer tablets. Cover articles also include architectural articles, transportation articles (e.g., interior and exterior display and non-display articles used in automotive applications, trains, aircraft, sea craft, etc.), appliance articles, or any article that may benefit from some transparency, scratch-resistance, abrasion resistance or a combination thereof. These applications often demand scratch-resistance and strong optical performance characteristics, in terms of maximum light transmittance and minimum reflectance. Furthermore, for some cover applications it is beneficial that the color exhibited or perceived, in reflection and/or transmission, does not change appreciably as the viewing angle is changed. In display applications, this is because, if the color in reflection or transmission changes with viewing angle to an appreciable degree, the user of the product will perceive a change in color or brightness of the display, which can diminish the perceived quality of the display. In other applications, changes in color may negatively impact the aesthetic appearance or other functional aspects of the device.

These display and non-display articles are often used in applications (e.g., mobile devices) with packaging constraints. In particular, many of these applications can significantly benefit from reductions in overall thickness, even reductions of a few percent. In addition, many of the applications that employ such display and non-display articles benefit from low manufacturing cost, e.g., through the minimization of raw material costs, minimization of process complexity and yield improvements. Smaller packaging with optical and mechanical property performance attributes comparable to existing display and non-display articles can also serve the desire for reduced manufacturing cost (e.g., through less raw material costs, through reductions in the number of layers in an anti-reflective structure, etc.).

The optical performance of cover articles can be improved by using various anti-reflective coatings; however known anti-reflective coatings are susceptible to wear or abrasion. Such abrasion can compromise any optical performance improvements achieved by the anti-reflective coating. For example, optical filters are often made from multilayer coatings having differing refractive indices and made from optically transparent dielectric material (e.g., oxides, nitrides, and fluorides). Most of the typical oxides used for such optical filters are wide band-gap materials, which do not have the requisite mechanical properties, for example hardness, for use in mobile devices, architectural articles, transportation articles or appliance articles. Most nitrides and diamond-like coatings may exhibit high hardness values, which can be correlated to improved abrasion resistance, but such materials do not exhibit the desired transmittance for such applications.

Abrasion damage can include reciprocating sliding contact from counter face objects (e.g., fingers). In addition, abrasion damage can generate heat, which can degrade chemical bonds in the film materials and cause flaking and other types of damage to the cover glass. Since abrasion damage is often experienced over a longer term than the single events that cause scratches, the coating materials disposed experiencing abrasion damage can also oxidize, which further degrades the durability of the coating.

Accordingly, there is a need for low reflectance, anti-reflective structures with controlled color and high mechanical durability, including articles having such structures.

SUMMARY

According to some embodiments of the disclosure, an article is provided that includes: a translucent substrate having a major surface; and an anti-reflective coating disposed on the major surface of the substrate and forming an anti-reflective surface, wherein the article exhibits a single side average photopic light reflectance at the anti-reflective surface of less than 0.35%. The article exhibits a single side color shift ($\Delta C$) of less than 6 under an International Commission on Illumination illuminant over an incident angle range from 0 degrees to 60 degrees incidence at the anti-reflective surface, wherein $\Delta C = \sqrt{((a^*_{max} - a^*_{min})^2 + (b^*_{max} - b^*_{min})^2)}$ with $a^*_{max}$, $a^*_{min}$, $b^*_{max}$, and $b^*_{min}$ as the maximum and minimum color coordinates in the (L*, a*, b*) colorimetery system for the respective a* and b* coordinates. Further, the anti-reflective coating comprises a physical thickness from about 50 nm to less than 500 nm. In addition, the anti-reflective coating comprises a plurality of layers, the plurality of layers comprising at least one low refractive index layer and at least one high refractive index layer, wherein the at least one high refractive index layer has a refractive index of greater than 2.0 and the at least one low refractive index layer has a refractive index of less than 1.7.

According to some embodiments of the disclosure, an article is provided that includes: a translucent substrate having a major surface; and an anti-reflective coating disposed on the major surface of the substrate and forming an anti-reflective surface. The article exhibits a single side average photopic light reflectance at the anti-reflective surface of less than 0.5%. Further, the article exhibits a single side color shift ($\Delta C$) of less than 8 under an International Commission on Illumination illuminant over an incident angle range from 0 degrees to 60 degrees incidence at the anti-reflective surface, wherein $\Delta C = \sqrt{((a^*_{max} - a^*_{min})^2 + (b^*_{max} - b^*_{min})^2)}$ with $a^*_{max}$, $a^*_{min}$, $b^*_{max}$, and $b^*_{min}$ as the maximum and minimum color coordinates in the (L*, a*, b*) colorimetery system for the respective a* and b* coordinates. In addition, the anti-reflective coating comprises a physical thickness from about 50 nm to less than 500 nm. Further, the anti-reflective coating comprises a maximum hardness of greater than 7 GPa as measured on the anti-reflective surface by a Berkovich Indenter Hardness Test along an indentation depth of about 100 nm and greater. The anti-reflective coating comprises a plurality of layers, the plurality of layers comprising at least one low refractive index layer and at least one high refractive index layer, wherein the at least one high refractive index layer has a refractive index of greater than 2.0 and the at least one low refractive index layer has a refractive index of less than 1.7.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims.

The accompanying drawings are included to provide a further understanding, and are incorporated in and constitute a part of this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
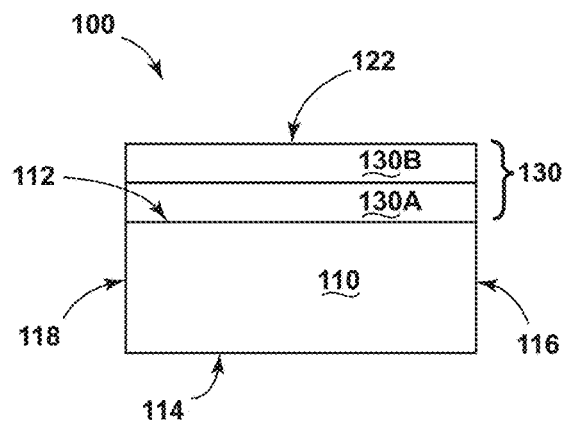
FIG. 1 is a side view of an article, according to one or more embodiments.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, for example within about 5% of each other, or within about 2% of each other.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes embodiments having two or more such components, unless the context clearly indicates otherwise.

Embodiments of the disclosure relate to low reflectance, anti-reflective structures with controlled color and articles having such structures and, more particularly, to articles with thin, multi-layer anti-reflective coatings exhibiting abrasion resistance, low reflectivity, and colorless transmittance and/or reflectance. Embodiments of these articles possess anti-reflective optical structures with a total physical thickness of less than 500 nm, while maintaining the hardness, abrasion resistance and optical properties associated with the intended applications for these articles (e.g., as covers, housings and substrates for display devices, interior and exterior automotive components, etc.).

Referring to FIG. 1, the article 100 according to one or more embodiments may include a substrate 110, and an anti-reflective coating 130 (also referred herein as an "optical film structure") disposed on the substrate. The substrate 110 includes opposing major surfaces 112, 114 and opposing minor surfaces 116, 118. The anti-reflective coating 130 is shown in FIG. 1 as being disposed on a first opposing major surface 112; however, the anti-reflective coating 130 may be disposed on the second opposing major surface 114 and/or one or both of the opposing minor surfaces 116, 118, in addition to or instead of being disposed on the first opposing major surface 112. The anti-reflective coating 130 forms an anti-reflective surface 122.

The anti-reflective coating 130 includes a plurality of layers, the plurality of layers comprising at least one low refractive index layer and at least one high refractive index layer. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by a discrete deposition or a continuous deposition process. In one or more embodiments, the layer may be formed using only continuous deposition processes, or, alternatively, only discrete deposition processes.

As used herein, the term "dispose" includes coating, depositing and/or forming a material onto a surface. The disposed material may constitute a layer, as defined herein. The phrase "disposed on" includes the instance of forming a material onto a surface such that the material is in direct contact with the surface and also includes the instance where the material is formed on a surface, with one or more intervening material(s) between the disposed material and the surface. The intervening material(s) may constitute a layer, as defined herein.

According to one or more embodiments, the anti-reflective coating 130 of the article 100 (e.g., as shown and described in connection with FIG. 1) can be characterized with abrasion resistance according to the Alumina SCE Test. As used herein, the "Alumina SCE Test" is conducted by subjecting a sample to a commercial 800 grit alumina sandpaper (10 mm×10 mm) with a total weight of 0.35 kg (350 g) for 500 or 1500 abrasion cycles at 60 cycles/min, using an ~1" stroke length powered by a Taber Industries 5750 linear abrader. Abrasion resistance is then characterized, according to the Alumina SCE Test, by measuring reflected specular component excluded (SCE) values (also referred herein as "reflected haze") from the abraded samples according to principles understood by those with ordinary skill in the field of the disclosure. More particularly, SCE is a measure of diffuse reflection off of the surface of the anti-reflection coating 130, as measured using a Konica-Minolta CM700D with a 6 mm diameter aperture. According to some implementations, the anti-reflective coating 130 of the articles 100 can exhibit SCE values, as obtained from the Alumina SCE Test, of less than 2%, less than 1.8%, less than 1.6%, less than 1.4%, less than 1.2%, less than 1%, less than 0.8%, less than 0.6%, less than 0.4%, or even less than 0.2%. Abrasion-induced damage increases the surface roughness leading to the increase in diffuse reflection (i.e., SCE values). Lower SCE values indicates less severe damage, indicative of improved abrasion resistance.

The anti-reflective coating 130 and the article 100 may be described in terms of a hardness measured by a Berkovich Indenter Hardness Test. Further, those with ordinary skill in the art can recognize that abrasion resistance of the anti-reflective coating 130 and the article 100 can be correlated to the hardness of these elements. As used herein, the "Berkovich Indenter Hardness Test" includes measuring the hardness of a material on a surface thereof by indenting the surface with a diamond Berkovich indenter. The Berkovich Indenter Hardness Test includes indenting the anti-reflective surface 122 of the article 100 or the surface of the anti-reflective coating 130 (or the surface of any one or more of the layers in the anti-reflective coating) with the diamond Berkovich indenter to form an indent to an indentation depth in the range from about 50 nm to about 1000 nm (or the entire thickness of the anti-reflective coating or layer, whichever is less) and measuring the hardness from this indentation at various points along the entire indentation depth range, along a specified segment of this indentation depth (e.g., in the depth range from about 100 nm to about 500 nm), or at a particular indentation depth (e.g., at a depth of 100 nm, at a depth of 500 nm, etc.) generally using the methods set forth in Oliver, W. C.; Pharr, G. M. An improved technique for determining hardness and elastic modulus using load and displacement sensing indentation experiments. See *J. Mater. Res.*, Vol. 7, No. 6, 1992, 1564-1583; and Oliver, W. C. and Pharr, G. M, "Measurement of Hardness and Elastic Modulus by Instrument Indentation: Advances in Understanding and Refinements to Methodology", *J. Mater. Res.*, Vol. 19, No. 1, 2004, 3-20. Further, when hardness is measured over an indentation depth range (e.g., in the depth range from about 100 nm to about 500 nm), the results can be reported as a maximum hardness within the specified range, wherein the maximum is selected from the measurements taken at each depth within that range. As used herein, "hardness" and "maximum hardness" both refer to as-measured hardness values, not averages of hardness values. Similarly, when hardness is measured at an indentation depth, the value of the hardness obtained from the Berkovich Indenter Hardness Test is given for that particular indentation depth.

Typically, in nanoindentation measurement methods (such as by using a Berkovich indenter) of a coating that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate.

The indentation depth range and the hardness values at certain indentation depth range(s) can be selected to identify a particular hardness response of the optical film structures and layers thereof, described herein, without the effect of the underlying substrate. When measuring hardness of the optical film structure (when disposed on a substrate) with a Berkovich indenter, the region of permanent deformation (plastic zone) of a material is associated with the hardness of the material. During indentation, an elastic stress field extends well beyond this region of permanent deformation.

As indentation depth increases, the apparent hardness and modulus are influenced by stress field interactions with the underlying substrate. The substrate influence on hardness occurs at deeper indentation depths (i.e., typically at depths greater than about 10% of the optical film structure or layer thickness). Moreover, a further complication is that the hardness response utilizes a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness but instead, reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical film structure thickness or the layer thickness.

As noted above, those with ordinary skill in the art can consider various test-related considerations in ensuring that the hardness and maximum hardness values of the coating 130 and article 100 obtained from the Berkovich Indenter Hardness Test are indicative of these elements, rather than being unduly influenced by the substrate 110, for example. Further, those with ordinary skill in the art can also recognize that embodiments of the disclosure surprisingly demonstrate high hardness values associated with the anti-reflective coating 130 despite the relatively low thickness of the coating 130 (i.e., <500 nm). Indeed, as evidenced by the Examples detailed below in subsequent sections, the hardness of certain of the high RI layer(s) 130B within an anti-reflective coating (see, e.g., FIGS. 1B and 1C), can significantly influence the overall hardness and maximum hardness of the anti-reflective coating 130 and article 100, despite the relatively low thickness values associated with these layers. This is surprising because of the above test-related considerations, which detail how measured hardness is directly influenced by the thickness of a coating, for example the anti-reflective coating 130. In general, as a coating (over a thicker substrate) is reduced in thickness, and as the volume of harder material (e.g., as compared to other layers within the coating having a lower hardness) in the coating decreases, it would be expected that the measured hardness of the coating will trend toward the hardness of the underlying substrate. Nevertheless, embodiments of the articles 100 of the disclosure, as including the anti-reflective coating 130 (and as also exemplified by the Examples outlined in detail below), surprisingly exhibit significantly high hardness values in comparison to the underlying substrate, thus demonstrating a unique combination of coating thickness (<500 nm), volumetric fraction of higher hardness material and optical properties.

In some embodiments, the anti-reflective coating 130 of the article 100 may exhibit a hardness of greater than about 8 GPa, as measured on the anti-reflective surface 122, by a Berkovich Indenter Hardness Test at an indentation depth of about 100 nm. The antireflective coating 130 may exhibit a hardness of about 6 GPa or greater, 6.5 GPa or greater, 7 GPa or greater, about 7.5 GPa or greater, about 8 GPa or greater, about 9 GPa or greater, or about 10 GPa or greater, about 11 GPa or greater, about 12 GPa or greater, about 13 GPa or greater, about 14 GPa or greater, about 15 GPa or greater, or any hardness value or range of hardness values within the foregoing ranges by a Berkovich Indenter Hardness Test at an indentation depth of about 100 nm. The article 100, including the anti-reflective coating 130 and any additional coatings, as described herein, may exhibit a hardness of about 8 GPa or greater, about 10 GPa or greater or about 12 GPa or greater, as measured on the anti-reflective surface 122, by a Berkovich Indenter Hardness Test at an indentation depth of about 100 nm or greater. Such measured hardness values may be exhibited by the anti-reflective coating 130 and/or the article 100 over an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). Similarly, maximum hardness values of about 6 GPa or greater, about 6.5 GPa or greater, about 7 GPa or greater, about 7.5 GPa or greater, about 8 GPa or greater, about 9 GPa or greater, about 10 GPa or greater, about 11 GPa or greater, about 12 GPa or greater, about 13 GPa or greater, about 14 GPa or greater, about 15 GPa or greater, or any hardness value or range of hardness values within the foregoing ranges by a Berkovich Indenter Hardness Test may be exhibited by the anti-reflective coating and/or the article over an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm).

Figure 1A:
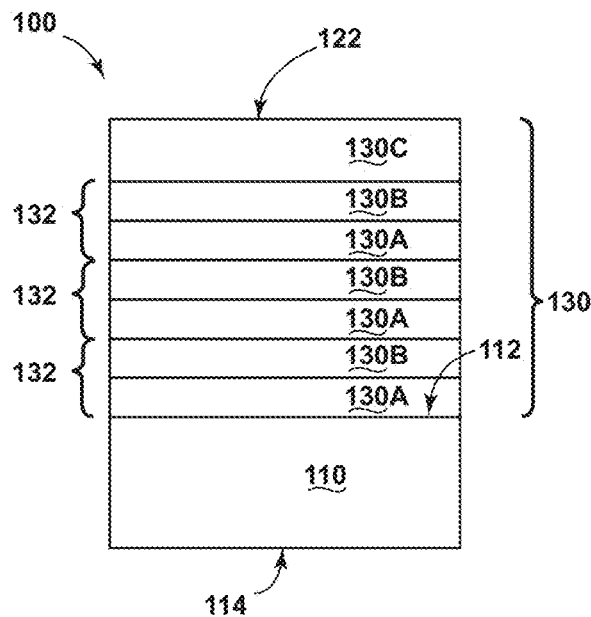
FIG. 1A is a side view of an article, according to one or more embodiments.
Figure 1B:
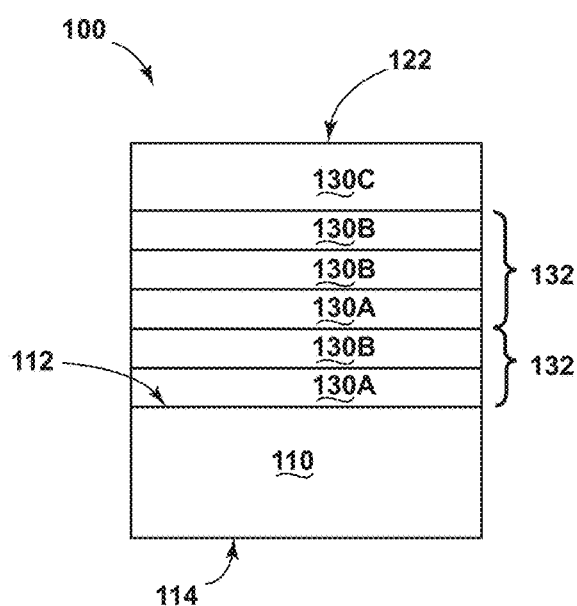
FIG. 1B is a side view of an article, according to one or more embodiments.
Figure 1C:
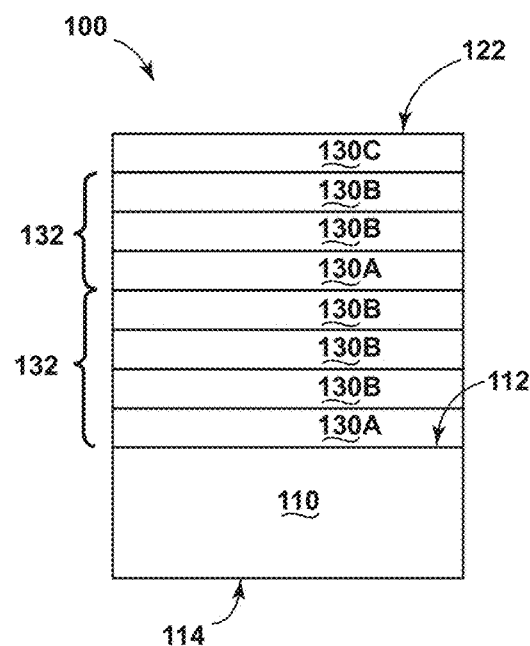
FIG. 1C is a side view of an article, according to one or more embodiments.

In addition, it is evident that certain of the anti-reflective coatings 130 of the articles 100, such as depicted in FIGS. 1-1C and made according to the Examples below with laboratory grade sputtering equipment, demonstrate hardness values that range from 6.2 GPa to 8.3 GPa at an indentation depth of 100 nm. Without being bound by theory, it is also believed that production grade sputtering equipment (e.g., in-line reactive sputtering or metal mode reactive sputtering equipment) can be employed to generate comparable anti-reflective coatings 130 of the articles 100, as made according to the Examples below, with hardness values of about 9 GPa or greater, about 10 GPa or greater, about 11 GPa or greater, about 12 GPa or greater, about 13 GPa or greater, about 14 GPa or greater, or even about 15 GPa or greater. Further, it is believed that the hardness results associated with the anti-reflective coatings 130 of the Examples are likely to trend significantly higher with production grade sputtering equipment because it is understood that the production grade equipment can deposit anti-reflective coatings with higher power densities than laboratory grade sputtering equipment.

In some implementations of the article 100, the anti-reflective coating 130 may have at least one layer made of material itself having a maximum hardness (as measured on the surface of such a layer, e.g., a surface of one or more of the second high RI layers 130B of FIGS. 1B or 1C) of about 18 GPa or greater, about 19 GPa or greater, about 20 GPa or greater, about 21 GPa or greater, about 22 GPa or greater, about 23 GPa or greater, about 24 GPa or greater, about 25 GPa or greater, and all hardness values therebetween, as measured by the Berkovich Indenter Hardness Test over an indentation depth from about 100 nm to about 500 nm. These measurements are made on a hardness test stack comprising the designated layer of the anti-reflective coating 130 at a physical thickness of about 2 microns, as disposed on a substrate 110, to minimize the thickness-related hardness measurement effects described earlier. The maximum hardness of such a layer may be in the range from about 18 GPa to about 26 GPa, as measured by the Berkovich Indenter Hardness Test over an indentation depth from about 100 nm to about 500 nm. Such maximum hardness values may be exhibited by the material of at least one layer (e.g., one or more of the high RI layer(s) 130B, as shown in FIGS. 1B or 1C) over an indentation depth of about 50 nm or greater or 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the article 100 exhibits a hardness that is greater than the hardness of the substrate (which can be measured on the opposite surface from the anti-reflective surface). Similarly, hardness values may be exhibited by the material of at least one layer (e.g., one or more of the high RI layer(s) 130B, as shown in FIGS. 1B or 1C) over an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In addition, these hardness and/or maximum hardness values associated with the at least one layer (e.g., the high RI layer(s) 130B) can also be observed at particular indentation depths (e.g., at 100 nm, 200 nm, etc.) over the measured indentation depth ranges.

Optical interference between reflected waves from the interface between the anti-reflective coating 130 and air, and from the interface between the anti-reflective coating 130 and substrate 110, can lead to spectral reflectance and/or transmittance oscillations that create apparent color in the article 100. As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). In one or more embodiments, the spectral resolution of the characterization of the transmittance and reflectance is less than 5 nm or 0.02 eV. The color may be more pronounced in reflection. The angular color shifts in reflection with viewing angle due to a shift in the spectral reflectance oscillations with incident illumination angle. Angular color shifts in transmittance with viewing angle are also due to the same shift in the spectral transmittance oscillation with incident illumination angle. The observed color and angular color shifts with incident illumination angle are often distracting or objectionable to device users, particularly under illumination with sharp spectral features for example fluorescent lighting and some LED lighting. Angular color shifts in transmission may also play a factor in angular color shift in reflection and vice versa. Factors in angular color shifts in transmission and/or reflection may also include angular color shifts due to viewing angle or color shifts away from a certain white point that may be caused by material absorption (somewhat independent of angle) defined by a particular illuminant or test system.

The oscillations may be described in terms of amplitude. As used herein, the term "amplitude" includes the peak-to-valley change in reflectance or transmittance. The phrase "average amplitude" includes the peak-to-valley change in reflectance or transmittance averaged within the optical wavelength regime. Unless otherwise noted, the "optical wavelength regime" includes the wavelength range from about 400 nm to about 800 nm (and more specifically from about 450 nm to about 650 nm). In some implementations, the articles 100 of the disclosure can also demonstrate high average transmittance in an infrared wavelength range from about 900 nm to 1000 nm.

The embodiments of this disclosure include an anti-reflective coating (e.g., anti-reflective coating 130 or optical film structure 130) to provide improved optical performance, in terms of colorlessness and/or smaller angular color shifts when viewed at varying incident illumination angles from normal incidence under different illuminants.

One aspect of this disclosure pertains to an article that exhibits colorlessness in reflectance and/or transmittance even when viewed at different incident illumination angles under an illuminant. In one or more embodiments, the article exhibits an angular color shift in reflectance and/or transmittance of about 8 or less, about 7 or less, about 6 or less, about 5 or less, about 4 or less, about 3 or less, about 2.5 or less, or about 2 or less, between a reference illumination angle and an incident illumination angle, e.g., from a reference illumination angle of 0 degrees to an incident illumination angle of 60 degrees. As used herein, the phrase "angular color shift" refers to the change in both a* and b*, under the CIE L*, a*, b* colorimetry system in reflectance and/or transmittance. It should be understood that unless otherwise noted, the L* coordinate of the articles described herein are the same at any angle or reference point and do not influence color shift. For example, angular color shift may be determined using the following Equation (1):

$$\sqrt{((a^*_2 - a^*_1)^2 + (b^*_2 - b^*_1)^2)} \qquad (1)$$

with $a^*_1$, and $b^*_1$ representing the a* and b* coordinates of the article when viewed at a reference illumination angle (which may include normal incidence) and $a^*_2$, and $b^*_2$ representing the a* and b* coordinates of the article when viewed at an incident illumination angle, provided that the incident illumination angle is different from reference illumination angle and in some cases differs from the reference illumination angle by about 1 degree or more, 2 degrees or more, or about 5 degrees or more, or about 10 degrees or more, or about 15 degrees or more, or about 20 degrees or more. In some instances, an angular color shift in reflectance and/or transmittance of about 10 or less (e.g., 5 or less, 4 or less, 3 or less, 2.5 or less, or 2 or less) is exhibited by the article when viewed at various incident illumination angles from a reference illumination angle, under an illuminant. In some instances the angular color shift in reflectance and/or transmittance is about 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, 0.5 or less, 0.4 or less, 0.3 or less, 0.2 or less, or 0.1 or less. In some embodiments, the angular color shift may be about 0. The illuminant can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). In specific examples, the articles exhibit an angular color shift in reflectance and/or transmittance of about 2 or less when viewed at incident illumination angle from the reference illumination angle under a CIE F2, F10, F11, F12 or D65 illuminant or more specifically under a CIE F2 illuminant.

The reference illumination angle may include normal incidence (i.e., 0 degrees), or 5 degrees from normal incidence, 10 degrees from normal incidence, 15 degrees from normal incidence, 20 degrees from normal incidence, 25 degrees from normal incidence, 30 degrees from normal incidence, 35 degrees from normal incidence, 40 degrees from normal incidence, 50 degrees from normal incidence, 55 degrees from normal incidence, or 60 degrees from normal incidence, provided the difference between the reference illumination angle and the difference between the incident illumination angle and the reference illumination angle is about 1 degree or more, 2 degrees or more, or about 5 degrees or more, or about 10 degrees or more, or about 15 degrees or more, or about 20 degrees or more. The incident illumination angle may be, with respect to the reference illumination angle, in the range from about 5 degrees to about 80 degrees, from about 5 degrees to about 70 degrees, from about 5 degrees to about 65 degrees, from about 5 degrees to about 60 degrees, from about 5 degrees to about 55 degrees, from about 5 degrees to about 50 degrees, from about 5 degrees to about 45 degrees, from about 5 degrees to about 40 degrees, from about 5 degrees to about 35 degrees, from about 5 degrees to about 30 degrees, from about 5 degrees to about 25 degrees, from about 5 degrees to about 20 degrees, from about 5 degrees to about 15 degrees, and all ranges and sub-ranges therebetween, away from normal incidence. The article may exhibit the angular color shifts in reflectance and/or transmittance described herein at and along all the incident illumination angles in the range from about 2 degrees to about 80 degrees, or from about 5 degrees to about 80 degrees, or from about 10 degrees to about 80 degrees, or from about 15 degrees to about 80 degrees, or from about 20 degrees to about 80 degrees, when the reference illumination angle is normal incidence. In some embodiments, the article may exhibit the angular color shifts in reflectance and/or transmittance described herein at and along all the incident illumination angles in the range from about 2 degrees to about 80 degrees, or from about 5 degrees to about 80 degrees, or from about 10 degrees to about 80 degrees, or from about 15 degrees to about 80 degrees, or from about 20 degrees to about 80 degrees, when the difference between the incident illumination angle and the reference illumination angle is about 1 degree or more, 2 degrees or more, or about 5 degrees or more, or about 10 degrees or more, or about 15 degrees or more, or about 20 degrees or more. In one example, the article may exhibit an angular color shift in reflectance and/or transmittance of 2 or less at any incident illumination angle in the range from about 2 degrees to about 60 degrees, from about 5 degrees to about 60 degrees, or from about 10 degrees to about 60 degrees away from a reference illumination angle equal to normal incidence. In other examples, the article may exhibit an angular color shift in reflectance and/or transmittance of 2 or less when the reference illumination angle is 10 degrees and the incident illumination angle is any angle in the range from about 12 degrees to about 60 degrees, from about 15 degrees to about 60 degrees, or from about 20 degrees to about 60 degrees away from the reference illumination angle.

In some embodiments, the angular color shift (ΔC) may be measured at all angles between a reference illumination angle (e.g., normal incidence) and an incident illumination angle in the range from about 0 degrees to about 60 degrees. In such implementations, the angular color shift (ΔC) may be determined using the following Equation (1A):

$$\sqrt{((a^*_{max}-a^*_{min})^2+(b^*_{max}-b^*_{min})^2)} \tag{1A}$$

with $a^*_{max}$, $a^*_{min}$, $b^*_{max}$, and $b^*_{min}$ as the maximum and minimum color coordinates in the (L*, a*, b*) colorimetry system for the respective a* and b* coordinates over the incident illumination angle in the range from about 0 degrees to about 60 degrees. In other words, the angular color shift (ΔC) may be measured and may be about 8 or less, about 7 or less, about 6 or less, about 5 or less, about 4 or less, about 3 or less, about 2.5 or less, or about 2 or less, at all incident angles in the range from about 0 degrees to about 20 degrees, from about 0 degrees to about 30 degrees, from about 0 degrees to about 40 degrees, from about 0 degrees to about 50 degrees, or from about 0 degrees to about 60 degrees.

In one or more embodiments, the article 100 exhibits a color in the CIE L*, a*, b* colorimetry system in reflectance and/or transmittance such that the distance or reference point color shift between the transmittance color or reflectance coordinates from a reference point is about 8 or less, about 7 or less, about 6 or less, about 5 or less, about 4 or less, about 3 or less, about 2.5 or less, or about 2 or less, under an illuminant (which can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). In specific examples, the articles exhibit a color shift in reflectance and/or transmittance of about 8 or less, about 7 or less, about 6 or less, about 5 or less, about 4 or less, about 3 or less, or about 2 or less, when viewed at incident illumination angles from the reference illumination angle under a CIE F2, F10, F11, F12 or D65 illuminant or more specifically under a CIE F2 illuminant. Stated another way, the article may exhibit a transmittance color (or transmittance color coordinates) and/or a reflectance color (or reflectance color coordinates) measured at the anti-reflective surface 122 having a reference point color shift of about 8 or less, about 7 or less, about 6 or less, about 5 or less, about 4 or less, about 3 or less, or about 2 or less, from a reference point, as defined herein. Unless otherwise noted, the transmittance color or transmittance color coordinates are measured on two surfaces of the article including at the anti-reflective surface 122 and the opposite bare surface of the article (i.e., 114). Unless otherwise noted, the reflectance color or reflectance color coordinates are measured on only the anti-reflective surface 122 of the article.

In one or more embodiments, the reference point may be the origin (0, 0) in the CIE L*, a*, b* colorimetry system (or the color coordinates a*=0, b*=0), color coordinates (−2, −2) or the transmittance or reflectance color coordinates of the substrate. It should be understood that unless otherwise noted, the L* coordinate of the articles described herein are the same as the reference point and do not influence color shift. Where the reference point color shift of the article is defined with respect to the substrate, the transmittance color coordinates of the article are compared to the transmittance color coordinates of the substrate and the reflectance color coordinates of the article are compared to the reflectance color coordinates of the substrate.

In one or more specific embodiments, the reference point color shift of the transmittance color and/or the reflectance color may be less than 1 or even less than 0.5. In one or more specific embodiments, the reference point color shift for the transmittance color and/or the reflectance color may be 1.8, 1.6, 1.4, 1.2, 0.8, 0.6, 0.4, 0.2, 0 and all ranges and sub-ranges therebetween. Where the reference point is the color coordinates a*=0, b*=0, the reference point color shift is calculated by Equation (2):

$$\text{reference point color shift} = \sqrt{((a^*_{article})^2 + (b^*_{article})^2)}. \quad (2)$$

Where the reference point is the color coordinates a*=−2, b*=−2, the reference point color shift is calculated by Equation (3):

$$\text{reference point color shift} = \sqrt{((a^*_{article}+2)^2 + (b^*_{article}+2)^2)}. \quad (3)$$

Where the reference point is the color coordinates of the substrate, the reference point color shift is calculated by Equation (4):

$$\text{reference point color shift} = \sqrt{((a^*_{article} - a^*_{substrate})^2 + (b^*_{article} - b^*_{substrate})^2)}. \quad (4)$$

In some embodiments, the article 100 may exhibit a transmittance color (or transmittance color coordinates) and a reflectance color (or reflectance color coordinates) such that the reference point color shift is less than 2 when the reference point is any one of the color coordinates of the substrate, the color coordinates a*=0, b*=0 and the coordinates a*=−2, b*=−2.

In some embodiments, the article 100 may exhibit a b* value in reflectance (as measured at the anti-reflective surface 122 only) in the range from about −6 to about +3, from about −5 to about +2, from about −4 to about +1, or any b* value or sub-range within the foregoing ranges, in the CIE L*, a*, b* colorimetry system at a near-normal incident angle (i.e., at about 0 degrees, or within 10 degrees of normal). In other implementations, the article 100 may exhibit a b* value in reflectance (as measured at the anti-reflective surface 122 only) in the range from about −10 to about +6, from about −8 to about +4, from about −6 to about +2, or any b* value or sub-range within the foregoing ranges, in the CIE L*, a*, b* colorimetry system at all incidence illumination angles in the range from about 0 to about 60 degrees (or from about 0 degrees to about 40 degrees, or from about 0 degrees to about 30 degrees).

In some embodiments, the article 100 may exhibit an a* value in reflectance (as measured at the anti-reflective surface 122 only) in the range from about −4 to about +3, from about −3 to about +2, from about −2 to about +1, or any a* value or sub-range within the foregoing ranges, in the CIE L*, a*, b* colorimetry system at a near-normal incident angle (i.e., at about 0 degrees, or within 10 degrees of normal). In other implementations, the article 100 may exhibit an a* value in reflectance (as measured at the anti-reflective surface 122 only) in the range from about −8 to about +4, from about −6 to about +3, from about −4 to about +2, from about −2 to about +2, or any a* value or sub-range within the foregoing ranges, in the CIE L*, a*, b* colorimetry system at all incidence illumination angles in the range from about 0 to about 60 degrees (or from about 0 degrees to about 40 degrees, or from about 0 degrees to about 30 degrees).

The article 100 of one or more embodiments, or the anti-reflective surface 122 of one or more articles, may exhibit an average light transmittance of about 94% or greater (e.g., about 94% or greater, about 95% or greater, about 96% or greater, about 96.5% or greater, about 97% or greater, about 97.5% or greater, about 98% or greater, about 98.5% or greater or about 99% or greater) over the optical wavelength regime in the range from about 400 nm to about 800 nm. In some implementations, the article 100 of one or more embodiments, or the anti-reflective surface 122 of one or more articles, may exhibit an average light transmittance of about 88% or greater, 88.5% or greater, 89% or greater, 89.5% or greater, 90% or greater, 90.5% or greater, 91% or greater, and all transmittance values and ranges within the foregoing ranges, over the infrared wavelength regime in the range from about 900 nm to about 1000 nm, or from 930 nm to 950 nm.

In some embodiments, the article 100, or the anti-reflective surface 122 of one or more articles, may exhibit an average light reflectance of about 2% or less, about 1.5% or less, about 1% or less, about 0.75% or less, about 0.5% or less, about 0.45% or less, about 0.4% or less, about 0.35% or less, about 0.30% or less, about 0.25% or less, about 0.2% or less, about 0.15% or less, or about 0.12% or less, over the optical wavelength regime in the range from about 400 nm to about 800 nm. These light transmittance and light reflectance values may be observed over the entire optical wavelength regime or over selected ranges of the optical wavelength regime (e.g., a 100 nm wavelength range, 150 nm wavelength range, a 200 nm wavelength range, a 250 nm wavelength range, a 280 nm wavelength range, or a 300 nm wavelength range, within the optical wavelength regime). In some embodiments, these light reflectance and transmittance values may be a total reflectance or total transmittance (taking into account reflectance or transmittance on both the anti-reflective surface 122 and the opposite major surfaces, 114). Unless otherwise specified, the average reflectance or transmittance is measured at an incident illumination angle of 0 degrees (however, such measurements may be provided at incident illumination angles of 45 degrees or 60 degrees).

In some embodiments, the article 100 of one or more embodiments, or the anti-reflective surface 122 of one or more articles, may exhibit a visible photopic average reflectance of about 2% or less, about 1% or less, about 0.9% or less, about 0.8% or less, about 0.7% or less, about 0.6% or less, about 0.5% or less, about 0.45% or less, about 0.4% or less, about 035% or less, about 0.3% or less, about 0.25% or less, about 0.2% or less, about 0.15% or less, or about 0.12% or less, over the optical wavelength regime. These photopic average reflectance values may be exhibited at incident illumination angles in the range from about 0° to about 20°, from about 0° to about 40°, or from about 0° to about 60°. As used herein, "photopic average reflectance" mimics the response of the human eye by weighting the reflectance versus wavelength spectrum according to the human eye's sensitivity. Photopic average reflectance may also be defined as the luminance, or tristimulus Y value of reflected light, according to known conventions for example CIE color space conventions. The photopic average reflectance is defined in Equation (5) as the spectral reflectance, R(λ) multiplied by the illuminant spectrum, I(λ) and the CIE's color matching function $\bar{y}(\lambda)$, related to the eye's spectral response:

$$\langle R_p \rangle = \int_{380\,nm}^{720\,nm} R(\lambda) \times I(\lambda) \times \bar{y}(\lambda) d\lambda. \quad (5)$$

In some embodiments, the anti-reflective surface 122 of one or more articles (i.e., when measuring the anti-reflective surface 122 only through a single-sided measurement), may exhibit a visible photopic average reflectance of about 2% or less, 1.8% or less, 1.5% or less, 1.2% or less, 1% or less, 0.9% or less, 0.7% or less, about 0.5% or less, about 0.45% or less, about 0.4% or less, about 0.35% or less, about 0.3% or less, about 0.25% or less, about 0.2% or less, about 0.15% or less, or about 0.12% or less. In such "single-sided" measurements as described in this disclosure, the reflectance from the second major surface (e.g., surface 114 shown in FIG. 1) is removed by coupling this surface to an indexmatched absorber. In some cases, the visible photopic average reflectance ranges are exhibited while simultaneously exhibiting a maximum reflectance color shift (i.e., ΔC as described above in Equation 1A), over the entire incident illumination angle range from about 5 degrees to about 60 degrees (with the reference illumination angle being normal incidence) using D65 illumination, of less than about 8, less than about 7, less than about 6, less than about 5, less than about 4, less than about 3, less than about 2, less than about 1.5, or less than about 1.25. These maximum reflectance color shift values represent the lowest color point value measured at any angle from about 5 degrees to about 60 degrees from normal incidence, subtracted from the highest color point value measured at any angle in the same range.

Substrate

The substrate 110 may include a translucent substrate material, such as an inorganic oxide material. Further, the substrate 100 may include an amorphous substrate, a crystalline substrate or a combination thereof. In one or more embodiments, the substrate exhibits a refractive index in the range from about 1.45 to about 1.55, e.g., 1.45, 1.46, 1.47, 1.48, 1.49, 1.50, 1.51, 1.52, 1.53, 1.54, 1.55, and all refractive indices therebetween.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween. The Young's modulus values for the substrate itself as recited in this disclosure refer to values as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates for example glass-ceramic, or ceramic, substrates (which may be strengthened or non-strengthened) or may include a single crystal structure, for example sapphire. In one or more specific embodiments, the substrate 110 includes an amorphous base (e.g., glass) and a crystalline cladding (e.g., sapphire layer, a polycrystalline alumina layer and/or or a spinel ($MgAl_2O_4$) layer).

The substrate 110 may be substantially planar or sheet-like, although other embodiments may utilize a curved or otherwise shaped or sculpted substrate. The substrate 110 may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 110 may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. In some embodiments, these light reflectance and transmittance values may be a total reflectance or total transmittance (taking into account reflectance or transmittance on both major surfaces of the substrate) or may be observed on a single side of the substrate (i.e., on the anti-reflective surface 122 only, without taking into account the opposite surface). Unless otherwise specified, the average reflectance or transmittance is measured at an incident illumination angle of 0 degrees (however, such measurements may be provided at incident illumination angles of 45 degrees or 60 degrees). The substrate 110 may optionally exhibit a color, for example white, black, red, blue, green, yellow, orange, etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate for example glass, various forming methods can include float glass processes, rolling processes, updraw processes, and down-draw processes, for example fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, for example thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps for example annealing, washing, and the like, are generally determined by the composition of the substrate and the desired compressive stress (CS), depth of compressive stress (CS) layer (or depth of layer) of the substrate that result from the strengthening operation. By way of example, ion exchange of alkali metal-containing glass substrates may be achieved by immersion in at least one molten bath containing a salt for example, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications", claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," claiming priority from U.S. Provisional Patent Application No. 61/084,398, filed Jul. 29, 2008, in which glass substrates are strengthened by ion exchange in a first bath diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), peak CS, depth of compression (DOC, which is the point along the thickness wherein compression changes to tension), and depth of ion layer (DOL). Peak CS, which is a maximum observed compressive stress, may be measured near the surface of the substrate 110 or within the strengthened glass at various depths. A peak CS value may include the measured CS at the surface ($CS_s$) of the strengthened substrate. In other embodiments, the peak CS is measured below the surface of the strengthened substrate. Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. As used herein, DOC means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Maximum CT values are measured using a scattered light polariscope (SCALP) technique known in the art. Refracted near-field (RNF) method or SCALP may be used to measure (graph, depict visually, or otherwise map out) the complete stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

In some embodiments, a strengthened substrate 110 can have a peak CS of 250 MPa or greater, 300 MPa or greater, 400 MPa or greater, 450 MPa or greater, 500 MPa or greater, 550 MPa or greater, 600 MPa or greater, 650 MPa or greater, 700 MPa or greater, 750 MPa or greater, or 800 MPa or greater. The strengthened substrate may have a DOC of 10 µm or greater, 15 µm or greater, 20 µm or greater (e.g., 25 µm, 30 µm, 35 µm, 40 µm, 45 µm, 50 µm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a peak CS greater than 500 MPa, a DOC greater than 15 µm, and a CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In some embodiments, the glass composition includes about 6 wt. % aluminum oxide or more. In some embodiments, the substrate includes a glass composition with one or more alkaline earth oxides, such that a content of alkaline earth oxides is about 5 wt. % or more. Suitable glass compositions, in some embodiments, further comprise at least one of $K_2O$, MgO, or CaO. In some embodiments, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. %

CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤($Li_2O+Na_2O+K_2O$)≤18 mol. % and 2 mol. %≤(MgO+CaO)≤7 mol. %.

In some embodiments, an alkali aluminosilicate glass composition suitable for the substrate 110 comprises alumina, at least one alkali metal and, in some embodiments, greater than 50 mol. % $SiO_2$, in other embodiments 58 mol. % $SiO_2$ or more, and in still other embodiments 60 mol. % $SiO_2$ or more, wherein the ratio ($Al_2O_3+B_2O_3$)/Σmodifiers (i.e., sum of modifiers) is greater than 1, wherein the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio ($Al_2O_3+B_2O_3$)/Σmodifiers (i.e., sum of modifiers) is greater than 1.

In some embodiments, the substrate 110 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2+B_2O_3+CaO$≤69 mol. %; $Na_2O+K_2O+B_2O_3+MgO+CaO+SrO$>10 mol. %; 5 mol. %≤MgO+CaO+SrO≤8 mol. %; ($Na_2O+B_2O_3$)–$Al_2O_3$≤2 mol. %; 2 mol. % $Na_2O-Al_2O_3$≤6 mol. %; and 4 mol. % ($Na_2O+K_2O$)–$Al_2O_3$≤10 mol. %.

In some embodiments, the substrate 110 may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110 may include a glass-ceramic substrate, which may be strengthened or non-strengthened. Examples of suitable glass-ceramics may include $Li_2O$—$Al_2O_3$—$SiO_2$ system (i.e. LAS-System) glass-ceramics, MgO—$Al_2O_3$—$Si_2$ system (i.e. MAS-System) glass-ceramics, and/or glass-ceramics that include a predominant crystal phase including β-quartz solid solution, β-spodumene ss, cordierite, and lithium disilicate. The glass-ceramic substrates may be strengthened using the chemical strengthening processes disclosed herein. In one or more embodiments, MAS-System glass-ceramic substrates may be strengthened in $Li_2SO_4$ molten salt, whereby an exchange of $2Li^+$ for $Mg^{2+}$ can occur.

The substrate 110, according to one or more embodiments, can have a physical thickness ranging from about 50 μm to about 5 mm. Example substrate 110 physical thicknesses range from about 50 μm to about 500 μm (e.g., 50, 100, 200, 300, 400 or 500 p.m). Further example substrate 110 physical thicknesses range from about 500 μm to about 1000 μm (e.g., 500, 600, 700, 800, 900 or 1000 μm). The substrate 110 may have a physical thickness greater than about 1 mm (e.g., about 2, 3, 4, or 5 mm). In one or more specific embodiments, the substrate 110 may have a physical thickness of 2 mm or less or less than 1 mm. The substrate 110 may be acid polished or otherwise treated to remove or reduce the effect of surface flaws.

Anti-Reflective Coating

As shown in FIG. 1, the anti-reflective coating 130 of the article 100 includes a plurality of layers that includes at least one low refractive (low RI) layer 130A and at least one high refractive index layer (high RI) layer 130B. Further, the low RI layer 130A has a refractive index of less than 1.7 and the high RI layer 130B has a refractive index of greater than 2.0. In some embodiments, one or more layers may be disposed on the opposite side of the substrate 110 from the anti-reflective coating 130 (i.e., on major surface 114)(not shown). In some embodiments of the article 100 depicted in FIG. 1, an additional layer 130C, as shown in FIGS. 1A-1C, can serve as a capping layer.

The physical thickness of the anti-reflective coating 130 may be in the range from about 50 nm to less than 500 nm. In some instances, the physical thickness of the anti-reflective coating 120 may be in the range from about 10 nm to less than 500 nm, from about 50 nm to less than 500 nm, from about 75 nm to less than 500 nm, from about 100 nm to less than 500 nm, from about 125 nm to less than 500 nm, from about 150 nm to less than 500 nm, from about 175 nm to less than 500 nm, from about 200 nm to less than 500 nm, from about 225 nm to less than 500 nm, from about 250 nm to less than 500 nm, from about 300 nm to less than 500 nm, from about 350 nm to less than 500 nm, from about 400 nm to less than 500 nm, from about 450 nm to less than 500 nm, from about 200 nm to about 450 nm, and all ranges and sub-ranges therebetween. For example, the physical thickness of the anti-reflective coating 120 may be from 10 nm to 490 nm, or from 10 nm to 480 nm, or from 10 nm to 475 nm, or from 10 nm to 460 nm, or from 10 nm to 450 nm, or from 10 nm to 450 nm, or from 10 nm to 430 nm, or from 10 nm to 425 nm, or from 10 nm to 420 nm, or from 10 nm to 410 nm, or from 10 nm to 400 nm, or from 10 nm to 350 nm, or from 10 nm to 300 nm, or from 10 nm to 250 nm, or from 10 nm to 225 nm, or from 10 nm to 200 nm, or from 15 nm to 490 nm, or from 20 nm to 490 nm, or from 25 nm to 490 nm, or from 30 nm to 490 nm, or from 35 nm to 490 nm, or from 40 nm to 490 nm, or from 45 nm to 490 nm, or from 50 nm to 490 nm, or from 55 nm to 490 nm, or from 60 nm to 490 nm, or from 65 nm to 490 nm, or from 70 nm to 490 nm, or from 75 nm to 490 nm, or from 80 nm to 490 nm, or from 85 nm to 490 nm, or from 90 nm to 490 nm, or from 95 nm to 490 nm, or from 100 nm to 490 nm, or from 10 nm to 485 nm, or from 15 nm to 480 nm, or from 20 nm to 475 nm, or from 25 nm to 460 nm, or from 30 nm to 450 nm, or from 35 nm to 440 nm, or from 40 nm to 430 nm, or from 50 nm to 425 nm, or from 55 nm to 420 nm, or from 60 nm to 410 nm, or from 70 nm to 400 nm, or from 75 nm to 400 nm, or from 80 nm to 390 nm, or from 90 nm to 380 nm, or from 100 nm to 375 nm, or from 110 nm to 370 nm, or from 120 nm to 360 nm, or from 125 nm to 350 nm, or from 130 nm to 325 nm, or from 140 nm to 320 nm, or from 150 nm to 310 nm, or from 160 nm to 300 nm, or from 170 nm to 300 nm, or from 175 nm to 300 nm, or from 180 nm to 290 nm, or from 190 nm to 280 nm, or from 200 nm to 275 nm.

In one or more embodiments, as shown in FIGS. 1A, 1B and 1C, the anti-reflective coating 130 of the article 100 may include a period 132 comprising two or more alternating layers. In one or more embodiments, the two or more layers may be characterized as having different refractive indices from each other. In some embodiments, the period 132 includes a first low RI layer 130A and a second high RI layer 130B. The difference in the refractive index of the first low RI layer 130A and the second high RI layer 130B may be about 0.01 or greater, 0.05 or greater, 0.1 or greater or even 0.2 or greater. In some implementations, the refractive index of the low RI layer(s) 130A is within the refractive index of the substrate 110 such that the refractive index of the low RI layer(s) 130A is less than about 1.7, and the high RI layer(s) 130B have a refractive index that is greater than 2.0.

As shown in FIGS. 1A, 1B and 1C, the anti-reflective coating 130 may include a plurality of periods (132). For the article 100 depicted in FIG. 1A, a single period 132 includes a first low RI layer 130A and a second high RI layer 130B, such that when a plurality of periods are provided, the first low RI layer 130A (designated for illustration as "L") and the second high RI layer 130B (designated for illustration as "H") alternate in the following sequence of layers: L/H/L/H or H/L/H/L, such that the first low RI layer and the second high RI layer appear to alternate along the physical thickness of the anti-reflective coating 130. In the example in FIG. 1A, the anti-reflective coating 130 includes three periods 132 such that there are three pairs of low RI and high RI layers 130A and 130B. In some implementations of the articles 100 depicted in FIG. 1A, the anti-reflective coating 130 can have from 1 to 20 periods (i.e., period 132), from 1 to 10 periods, or from 1 to 4 periods. In some embodiments, the anti-reflective coating 130 may include up to 25 periods (i.e., period 132). For example, the anti-reflective coating 130 may include from about 2 to about 20 periods, from about 2 to about 15 periods, from about 2 to about 10 periods, from about 2 to about 12 periods, from about 3 to about 8 periods, from about 3 to about 6 periods (i.e., period 132).

Referring to the article 100 depicted in FIG. 1B, the anti-reflective coating 130 includes two periods 132 such that there is a first pair of low RI and high RI layers 130A and 130B over the substrate 100, and a second group of a low RI layer 130A and two high RI layers 130B. Referring to the article 100 depicted in FIG. 1C, the anti-reflective coating 130 includes two periods 130 such that there is a first group of a low RI layer 130A and three high RI layers 130B over the substrate 100, and a second group of a low RI layer 130A and two high RI layers 130B. As depicted in FIGS. 1B and 1C, each of the periods 132 includes at least one low RI layer 130A and at least one high RI layer 130B. Further, those with ordinary skill in the field of the disclosure will recognize that the possible combinations and sequences of low and high RI layers 130A, 130B in each of the periods 132 depicted in the anti-reflective coatings 130 shown in FIGS. 1B and 1C are not limited to those shown in these figures. Further, in some implementations of the articles 100 depicted in FIGS. 1B and 1C, the anti-reflective coating 130 can have from 1 to 20 periods (i.e., period 132), from 1 to 10 periods, or from 1 to 4 periods. In some embodiments, the anti-reflective coating 130 may include up to 25 periods (i.e., period 132). For example, the anti-reflective coating 130 may include from about 2 to about 20 periods, from about 2 to about 15 periods, from about 2 to about 10 periods, from about 2 to about 12 periods, from about 3 to about 8 periods, from about 3 to about 6 periods (i.e., period 132).

In the embodiments of the article 100 shown in FIGS. 1A, 1B and 1C, the anti-reflective coating 130 may include an additional capping layer 130C, which may include a lower refractive index material than the high RI layer 130B. In some implementations, the refractive index of the capping layer 130C is the same or substantially the same as the refractive index of the low RI layers 130A.

As used herein, the terms "low RI" and "high RI" refer to the relative values for the RI of each layer relative to the RI of another layer within the anti-reflective coating 130 (e.g., low RI<high RI). In one or more embodiments, the term "low RI" when used with the low RI layer 130A or with the capping layer 130C, includes a range from about 1.3 to about 1.7, or from about 1.3 to less than 1.7. In one or more embodiments, the term "high RI" when used with the high RI layer 130B, includes a range from about 2.0 to about 2.5, or greater than 2.0.

Exemplary materials suitable for use in the anti-reflective coating 130 include: $SiO_2$, $Al_2O_3$, $GeO_2$, SiO, $AlO_xN_y$, AlN, oxygen-doped $SiN_x$, $SiN_x$, $SiO_xN_y$, $Si_uAl_vO_xN_y$, $TiO_2$, $ZrO_2$, TiN, MgO, $Nb_2O_5$, $Ta_2O_3$, $HfO_2$, $Y_2O_3$, $ZrO_2$, diamond-like carbon, and $MgAl_2O_4$.

Some examples of suitable materials for use in the low RI layer(s) 130A include $SiO_2$, $Al_2O_3$, $GeO_2$, SiO, $AlO_xN_y$, $SiO_xN_y$, $Si_uAl_vO_xN_y$, MgO, and $MgAl_2O_4$. The nitrogen content of the materials for use in the first low RI layer 130A (i.e., the layer 130A in contact with the substrate 110) may be minimized (e.g., in materials for example $Al_2O_3$ and $MgAl_2O_4$). In some embodiments, the low RI layer(s) 130A and a capping layer 130C, if present, in the anti-reflective coating 130 can comprise one or more of a silicon-containing oxide (e.g., silicon dioxide), a silicon-containing nitride (e.g., an oxide-doped silicon nitride, silicon nitride, etc.), and a silicon-containing oxynitride (e.g., silicon oxynitride). In some embodiments of the article 100, the low RI layer(s) 130A and the capping layer 130C comprise a silicon-containing oxide, e.g., $SiO_2$.

As used herein, the "$AlO_xN_y$," "$SiO_xN_y$," and "$Si_uAl_xO_yN_z$" materials in the disclosure include various aluminum oxynitride, silicon oxynitride and silicon aluminum oxynitride materials, as understood by those with ordinary skill in the field of the disclosure, described according to certain numerical values and ranges for the subscripts, "u," "x," "y," and "z". That is, it is common to describe solids with "whole number formula" descriptions, for example $Al_2O_3$. It is also common to describe solids using an equivalent "atomic fraction formula" description for example $Al_{0.4}O_{0.6}$, which is equivalent to $Al_2O_3$. In the atomic fraction formula, the sum of all atoms in the formula is 0.4+0.6=1, and the atomic fractions of Al and O in the formula are 0.4 and 0.6 respectively. Atomic fraction descriptions are described in many general textbooks and atomic fraction descriptions are often used to describe alloys. See, for example: (i) Charles Kittel, Introduction to Solid State Physics, seventh edition, John Wiley & Sons, Inc., NY, 1996, pp. 611-627; (ii) Smart and Moore, Solid State Chemistry, An introduction, Chapman & Hall University and Professional Division, London, 1992, pp. 136-151; and (iii) James F. Shackelford, Introduction to Materials Science for Engineers, Sixth Edition, Pearson Prentice Hall, New Jersey, 2005, pp. 404-418.

Again referring to the "$AlO_xN_y$," "$SiO_xN_y$," and "$Si_uAl_xO_yN_z$" materials in the disclosure, the subscripts allow those with ordinary skill in the art to reference these materials as a class of materials without specifying particular subscript values. To speak generally about an alloy, for example aluminum oxide, without specifying the particular subscript values, we can speak of $Al_vO_x$. The description $Al_vO_x$ can represent either $Al_2O_3$ or $Al_{0.4}O_{0.6}$. If v+x were chosen to sum to 1 (i.e. v+x=1), then the formula would be an atomic fraction description. Similarly, more complicated mixtures can be described, for example $Si_uAl_vO_xN_y$, where again, if the sum u+v+x+y were equal to 1, we would have the atomic fractions description case.

Once again referring to the "$AlO_xN_y$," "$SiO_xN_y$," and "$Si_uAl_xO_yN_z$" materials in the disclosure, these notations allow those with ordinary skill in the art to readily make comparisons to these materials and others. That is, atomic fraction formulas are sometimes easier to use in comparisons. For instance; an example alloy consisting of $(Al_2O_3)_{0.3}(AlN)_{0.7}$ is closely equivalent to the formula descriptions $Al_{0.448}O_{0.31}N_{0.241}$ and also $Al_{367}O_{254}N_{198}$. Another example alloy consisting of $(Al_2O_3)_{0.4}(AlN)_{0.6}$ is closely equivalent to the formula descriptions $Al_{0.438}O_{0.375}N_{0.188}$ and $Al_{37}O_{32}N_{16}$. The atomic fraction formulas $Al_{0.448}O_{0.31}N_{0.241}$ and $Al_{0.438}O_{0.375}N_{0.188}$ are relatively easy to compare to one another. For instance, Al decreased in atomic fraction by 0.01, O increased in atomic fraction by 0.065 and N decreased in atomic fraction by 0.053. It takes more detailed calculation and consideration to compare the whole number formula descriptions $Al_{367}O_{254}N_{198}$ and $Al_{37}O_{32}N_{16}$. Therefore, it is sometimes preferable to use atomic fraction formula descriptions of solids. Nonetheless, the use of $Al_vO_xN_y$ is general since it captures any alloy containing Al, O and N atoms.

As understood by those with ordinary skill in the field of the disclosure with regard to any of the foregoing materials (e.g., AlN) for the optical film 80, each of the subscripts, "u," "x," "y," and "z," can vary from 0 to 1, the sum of the subscripts will be less than or equal to one, and the balance of the composition is the first element in the material (e.g., Si or Al). In addition, those with ordinary skill in the field can recognize that "$Si_uAl_xO_yN_z$" can be configured such that "u" equals zero and the material can be described as "$AlO_xN_y$". Still further, the foregoing compositions for the optical film 80 exclude a combination of subscripts that would result in a pure elemental form (e.g., pure silicon, pure aluminum metal, oxygen gas, etc.). Finally, those with ordinary skill in the art will also recognize that the foregoing compositions may include other elements not expressly denoted (e.g., hydrogen), which can result in non-stoichiometric compositions (e.g., $SiN_x$ vs. $Si_3N_4$). Accordingly, the foregoing materials for the optical film can be indicative of the available space within a $SiO_2$—$Al_2O_3$—$SiN_x$—AlN or a $SiO_2$—$Al_2O_3$—$Si_3N_4$—AlN phase diagram, depending on the values of the subscripts in the foregoing composition representations.

Some examples of suitable materials for use in the high RI layer(s) 130B include $Si_uAl_xO_yN_y$, AlN, oxygen-doped $SiN_x$, $SiN_x$, $Si_3N_4$, $AlO_xN_y$, $SiO_xN_y$, $Nb_2O_5$, $Ta_2O_3$, $HfO_2$, $TiO_2$, $ZrO_2$, $Y_2O_3$, $ZrO_2$, $Al_2O_3$, and diamond-like carbon. The oxygen content of the materials for the high RI layer(s) 130B may be minimized, especially in $SiN_x$ or $AlN_x$ materials. The foregoing materials may be hydrogenated up to about 30% by weight. In some embodiments, the high RI layer(s) 130B in the anti-reflective coating 130 can comprise one or more of a silicon-containing oxide (e.g., silicon dioxide), a silicon-containing nitride (e.g., an oxide-doped silicon nitride, silicon nitride, etc.), and a silicon-containing oxynitride (e.g., silicon oxynitride). In some embodiments of the article 100, such as depicted in FIGS. 1 and 1A, the high RI layer(s) 130B of the anti-reflective coating 130 comprise one or more of $Nb_2O_5$, $TiO_2$, $Ta_2O_3$ and $HfO_2$. In some embodiments of the article 100, such as depicted in FIGS. 1B and 1C, the high RI layer(s) 130B of the anti-reflective coating 130 comprise one or more of $SiN_x$, $AlO_xN_y$, $SiO_xN_y$, $SiAl_vO_xN_y$, $Nb_2O_5$, $TiO_2$, $Ta_2O_3$ and $HfO_2$. Where a material having a medium refractive index is desired between a high RI and a low RI, some embodiments may utilize AlN and/or $SiO_xN_y$. The hardness of one or more of the high RI layers 130B may be characterized specifically. In some embodiments, the maximum hardness of one or more of the high RI layer(s) 130B, as measured by the Berkovich Indenter Hardness Test over an indentation depth from about 100 nm to about 500 nm (i.e., as on a hardness test stack with a 2 micron thick layer of the material of the layer 130B disposed on a substrate 110), may be about 18 GPa or greater, about 20 GPa or greater, about 22 GPa or greater, about 24 GPa or greater, about 26 GPa or greater, and all values therebetween.

In one or more embodiments at least one of the layers of the anti-reflective coating 130 of the article 100 may include a specific optical thickness range. As used herein, the term "optical thickness" is determined by (n*d), where "n" refers to the RI of the sub-layer and "d" refers to the physical thickness of the layer. In one or more embodiments, at least one of the layers of the anti-reflective coating 130 may include an optical thickness in the range from about 2 nm to about 200 nm, from about 10 nm to about 100 nm, or from about 15 nm to about 100 nm. In some embodiments, all of the layers in the anti-reflective coating 130 may each have an optical thickness in the range from about 2 nm to about 200 nm, from about 10 nm to about 100 nm, or from about 15 nm to about 100 nm. In some cases, at least one layer of the anti-reflective coating 130 has an optical thickness of about 50 nm or greater. In some cases, each of the low RI layers 130A have an optical thickness in the range from about 2 nm to about 200 nm, from about 10 nm to about 100 nm, or from about 15 nm to about 100 nm. In other cases, each of the high RI layers 130B have an optical thickness in the range from about 2 nm to about 200 nm, from about 10 nm to about 100 nm, or from about 15 nm to about 100 nm. In some embodiments, each of the high RI layers 130B have an optical thickness in the range from about 2 nm to about 500 nm, or from about 10 nm to about 490 nm, or from about 15 nm to about 480 nm, or from about 25 nm to about 475 nm, or from about 25 nm to about 470 nm, or from about 30 nm to about 465 nm, or from about 35 nm to about 460 nm, or from about 40 nm to about 455 nm, or from about 45 nm to about 450 nm, and any and all sub-ranges between these values. In some embodiments, the capping layer 130C (see FIGS. 1A, 1B and 1C), or the outermost low RI layer 130A for configurations without a capping layer 130C, has a physical thickness of less than about 100 nm, less than about 90 nm, less than about 85 nm, or less than 80 nm.

As noted earlier, embodiments of the article 100, such as depicted in FIGS. 1-1C, are configured such that the physical thickness of one or more of the layers of the anti-reflective coating 130 are minimized. In one or more embodiments, the physical thickness of the high RI layer(s) 130B and/or the low RI layer(s) 130A are minimized such that they total less than 500 nm. In one or more embodiments, the combined physical thickness of the high RI layer(s) 130B, the low RI layer(s) 130A and any capping layer 130C is less than 500 nm, less than 490 nm, less than 480 nm, less than 475 nm, less than 470 nm, less than 460 nm, less than about 450 nm, less than 440 nm, less than 430 nm, less than 425 nm, less than 420 nm, less than 410 nm, less than about 400 nm, less than about 350 nm, less than about 300 nm, less than about 250 nm, or less than about 200 nm, and all total thickness values below 500 nm and above 10 nm. For example, the combined physical thickness of the high RI layer(s) 130B, the low RI layer(s) 130A and any capping layer 130C may be from 10 nm to 490 nm, or from 10 nm to 480 nm, or from 10 nm to 475 nm, or from 10 nm to 460 nm, or from 10 nm to 450 nm, or from 10 nm to 450 nm, or from 10 nm to 430 nm, or from 10 nm to 425 nm, or from 10 nm to 420 nm, or from 10 nm to 410 nm, or from 10 nm to 400 nm, or from 10 nm to 350 nm, or from 10 nm to 300 nm, or from 10 nm to 250 nm, or from 10 nm to 225 nm, or from 10 nm to 200 nm, or from 15 nm to 490 nm, or from 20 nm to 490 nm, or from 25 nm to 490 nm, or from 30 nm to 490 nm, or from 35 nm to 490 nm, or from 40 nm to 490 nm, or from 45 nm to 490 nm, or from 50 nm to 490 nm, or from 55 nm to 490 nm, or from 60 nm to 490 nm, or from 65 nm to 490 nm, or from 70 nm to 490 nm, or from 75 nm to 490 nm, or from 80 nm to 490 nm, or from 85 nm to 490 nm, or from 90 nm to 490 nm, or from 95 nm to 490 nm, or from 100 nm to 490 nm, or from 10 nm to 485 nm, or from 15 nm to 480 nm, or from 20 nm to 475 nm, or from 25 nm to 460 nm, or from 30 nm to 450 nm, or from 35 nm to 440 nm, or from 40 nm to 430 nm, or from 50 nm to 425 nm, or from 55 nm to 420 nm, or from 60 nm to 410 nm, or from 70 nm to 400 nm, or from 75 nm to 400 nm, or from 80 nm to 390 nm, or from 90 nm to 380 nm, or from 100 nm to 375 nm, or from 110 nm to 370 nm, or from 120 nm to 360 nm, or from 125 nm to 350 nm, or from 130 nm to 325 nm, or from 140 nm to 320 nm, or from 150 nm to 310 nm, or from 160 nm to 300 nm, or from 170 nm to 300 nm, or from 175 nm to 300 nm, or from 180 nm to 290 nm, or from 190 nm to 280 nm, or from 200 nm to 275 nm.

In one or more embodiments, the combined physical thickness of the high RI layer(s) 130B may be characterized. For example, in some embodiments, the combined physical thickness of the high RI layer(s) 130B may be about 90 nm or greater, about 100 nm or greater, about 150 nm or greater, about 200 nm or greater, about 250 nm or greater, or about 300 nm or greater, but less than 500 nm. The combined physical thickness is the calculated combination of the physical thicknesses of the individual high RI layer(s) 130B in the anti-reflective coating 130, even when there are intervening low RI layer(s) 130A or other layer(s). In some embodiments, the combined physical thickness of the high RI layer(s) 130B, which may comprise one or more layers of a high-hardness material (e.g., a nitride or an oxynitride), may be greater than 35% of the total physical thickness of the anti-reflective coating 130 (or, alternatively referred to in the context of volume). For example, the combined physical thickness (or volume) of the high RI layer(s) 130B may be about 35% or greater, about 40% or greater, about 45% or greater, about 50% or greater, about 55% or greater, or even about 60% or greater, of the total physical thickness (or volume) of the anti-reflective coating 130.

In some embodiments, the anti-reflective coating 130 exhibits a photopic average light reflectance of 1% or less, 0.9% or less, 0.8% or less, 0.7% or less, 0.6% or less, 0.5% or less, 0.4% or less, 0.35% or less, 0.3% or less, 0.25% or less, 0.2% or less, 0.15% or less, or 0.12% or less, over the optical wavelength regime, when measured at the anti-reflective surface 122 (e.g., when removing the reflections from an uncoated back surface (e.g., 114 in FIG. 1) of the article 100, for example through using index-matching oils on the back surface coupled to an absorber, or other known methods). In some instances, the anti-reflective coating 130 may exhibit such average light reflectance over other wavelength ranges for example from about 450 nm to about 650 nm, from about 420 nm to about 680 nm, from about 420 nm to about 700 nm, from about 420 nm to about 740 nm, from about 420 nm to about 850 nm, or from about 420 nm to about 950 nm. In some embodiments, the anti-reflective surface 122 exhibits a photopic average light transmission of about 90% or greater, 92% or greater, 94% or greater, 96% or greater, or 98% or greater, over the optical wavelength regime. Unless otherwise specified, the average reflectance or transmittance is measured at an incident illumination angle of 0 degrees (however, such measurements may be provided at incident illumination angles of 45 degrees or 60 degrees).

According to some implementations of the articles 100 depicted in FIGS. 1-1C, the coated article (i.e., as including the anti-reflective coating 130) may exhibit an elastic modulus (or Young's modulus) in the range from about 30 GPa to about 120 GPa. In some instances, the elastic modulus of the article 100 may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween. According to some embodiments, the elastic modulus of the article 100 may be greater than 80 GPa, greater than 85 GPa, greater than 90 GPa, greater than 95 GPa, or any modulus value or sub-range of values between the foregoing values.

The articles 100 depicted in FIGS. 1-1C may include one or more additional coatings disposed on the anti-reflective coating 130 (not shown in the figures). In one or more embodiments, the additional coating may include an easy-to-clean coating. An example of a suitable easy-to-clean coating is described in U.S. patent application Ser. No. 13/690,904, entitled "PROCESS FOR MAKING OF GLASS ARTICLES WITH OPTICAL AND EASY-TO-CLEAN COATINGS," filed on Nov. 30, 2012, which is incorporated herein in its entirety by reference. The easy-to-clean coating may have a physical thickness in the range from about 5 nm to about 50 nm and may include known materials for example fluorinated silanes. In some embodiments, the easy-to-clean coating may have a physical thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm or from about 7 nm to about 10 nm, and all ranges and sub-ranges therebetween.

The additional coating outlined above (not shown in FIGS. 1-1C) may include a scratch resistant coating. Exemplary materials used in the scratch resistant coating may include an inorganic carbide, nitride, oxide, diamond-like material, or combination of these. Examples of suitable materials for the scratch resistant coating include metal oxides, metal nitrides, metal oxynitride, metal carbides, metal oxycarbides, and/or combinations thereof. Exemplary metals include B, Al, Si, Ti, V, Cr, Y, Zr, Nb, Mo, Sn, Hf, Ta and W. Specific examples of materials that may be utilized in the scratch resistant coating may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, and combinations thereof.

In some embodiments, the additional coating (not shown in FIGS. 1-1C) includes a combination of easy-to-clean material and scratch resistant material. In one example, the combination includes an easy-to-clean material and diamond-like carbon. Such additional coatings may have a physical thickness in the range from about 5 nm to about 20 nm. The constituents of the additional coating may be provided in separate layers. For example, the diamond-like carbon material may be disposed as a first layer and the easy-to-clean material can be disposed as a second layer on the first layer of diamond-like carbon. The physical thicknesses of the first layer and the second layer may be in the ranges provided above for the additional coating. For example, the first layer of diamond-like carbon may have a physical thickness of about 1 nm to about 20 nm or from about 4 nm to about 15 nm (or more specifically about 10 nm) and the second layer of easy-to-clean may have a physical thickness of about 1 nm to about 10 nm (or more specifically about 6 nm). The diamond-like coating may include tetrahedral amorphous carbon (Ta-C), Ta-C:H, and/or a-C-H.

A further aspect of this disclosure pertains to a method for forming the articles 100 described herein (e.g., as shown in FIGS. 1-1C). In some embodiments, the method includes providing a substrate having a major surface in a coating chamber, forming a vacuum in the coating chamber, forming a durable anti-reflective coating having a physical thickness of about 500 nm or less on the major surface, optionally forming an additional coating comprising at least one of an easy-to-clean coating or a scratch resistant coating, on the anti-reflective coating, and removing the substrate from the coating chamber. In one or more embodiments, the anti-reflective coating and the additional coating are formed in either the same coating chamber or without breaking vacuum in separate coating chambers.

In one or more embodiments, the method may include loading the substrate on carriers which are then used to move the substrate in and out of different coating chambers, under load lock conditions so that a vacuum is preserved as the substrate is moved.

The anti-reflective coating 130 (i.e., as including layers 130A, 130B and optical layer 130C) and/or any additional coating (e.g., additional coating(s) not shown in FIGS. 1-1C) may be formed using various deposition methods for example vacuum deposition techniques, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. Liquid-based methods may also be used for example spraying or slot coating. Where vacuum deposition is utilized, inline processes may be used to form the anti-reflective coating 130 and/or the additional coating in one deposition run. In some instances, the vacuum deposition can be made by a linear PECVD source. In some implementations of the method, and articles 100 made according to the method, the anti-reflective coating 130 can be prepared using a sputtering process (e.g., a reactive sputtering process), chemical vapor deposition (CVD) process, plasma-enhanced chemical vapor deposition process, or some combination of these processes. In one implementation, an anti-reflective coating 130 comprising low RI layer(s) 130A and high RI layer(s) 130B can be prepared according to a reactive sputtering process. According to some embodiments, the anti-reflective coating 130 (including low RI layer 130A, high RI layer 130B and capping layer 130C) of the article 100 is fabricated using a metal-mode, reactive sputtering in a rotary drum coater. The reactive sputtering process conditions were defined through careful experimentation to achieve the desired combinations of hardness, refractive index, optical transparency, low color and controlled film stress.

In some embodiments, the method may include controlling the physical thickness of the anti-reflective coating 130 (e.g., including its layers 130A, 130B and 130C) and/or the additional coating so that it does not vary by more than about 4% along about 80% or more of the area of the anti-reflective surface 122 or from the target physical thickness for each layer at any point along the substrate area. In some embodiments, the physical thickness of the anti-reflective layer coating 130 and/or the additional coating is controlled so that it does not vary by more than about 4% along about 95% or more of the area of the anti-reflective surface 122.

In some embodiments of the article 100 depicted in FIGS. 1-1C, the anti-reflective coating 130 is characterized by a residual stress of less than about +50 MPa (tensile) to about −1000 MPa (compression). In some implementations of the article 100, the anti-reflective coating 130 is characterized by a residual stress from about −50 MPa to about −1000 MPa (compression), or from about −75 MPa to about −800 MPa (compression). Unless otherwise noted, residual stress in the anti-reflective coating 120 is obtained by measuring the curvature of the substrate 110 before and after deposition of the anti-reflective coating 120, and then calculating residual film stress according to the Stoney equation according to principles known and understood by those with ordinary skill in the field of the disclosure.

Figure 2A:
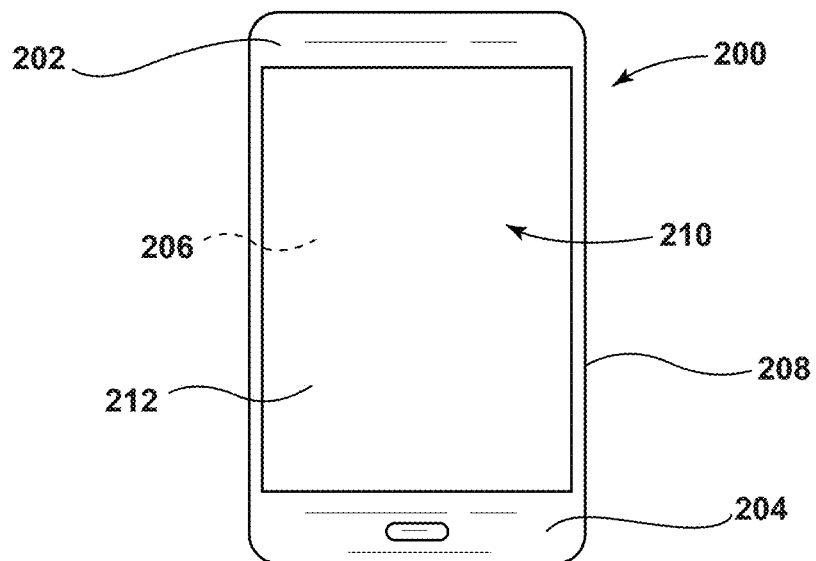
FIG. 2A is a plan view of an exemplary electronic device incorporating any of the articles disclosed herein.
Figure 2B:
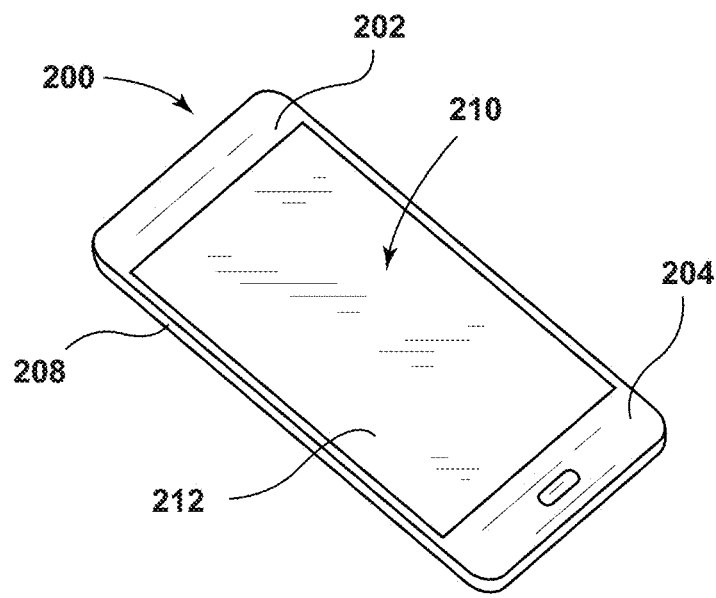
FIG. 2B is a perspective view of the exemplary electronic device of FIG. 2A.

The articles 100 disclosed herein (e.g., as shown in FIGS. 1-1C) may be incorporated into a device article for example a device article with a display (or display device articles) (e.g., consumer electronics, including mobile phones, tablets, computers, navigation systems, wearable devices (e.g., watches) and the like), augmented-reality displays, heads-up displays, glasses-based displays, architectural device articles, transportation device articles (e.g., automotive, trains, aircraft, sea craft, etc.), appliance device articles, or any device article that benefits from some transparency, scratch-resistance, abrasion resistance or a combination thereof. An exemplary device article incorporating any of the articles disclosed herein (e.g., as consistent with the articles 100 depicted in FIGS. 1-1C) is shown in FIGS. 2A and 2B. Specifically, FIGS. 2A and 2B show a consumer electronic device 200 including a housing 202 having a front 204, a back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, the cover substrate 212 may include any of the articles disclosed herein. In some embodiments, at least one of a portion of the housing or the cover glass comprises the articles disclosed herein.

Figure 3:
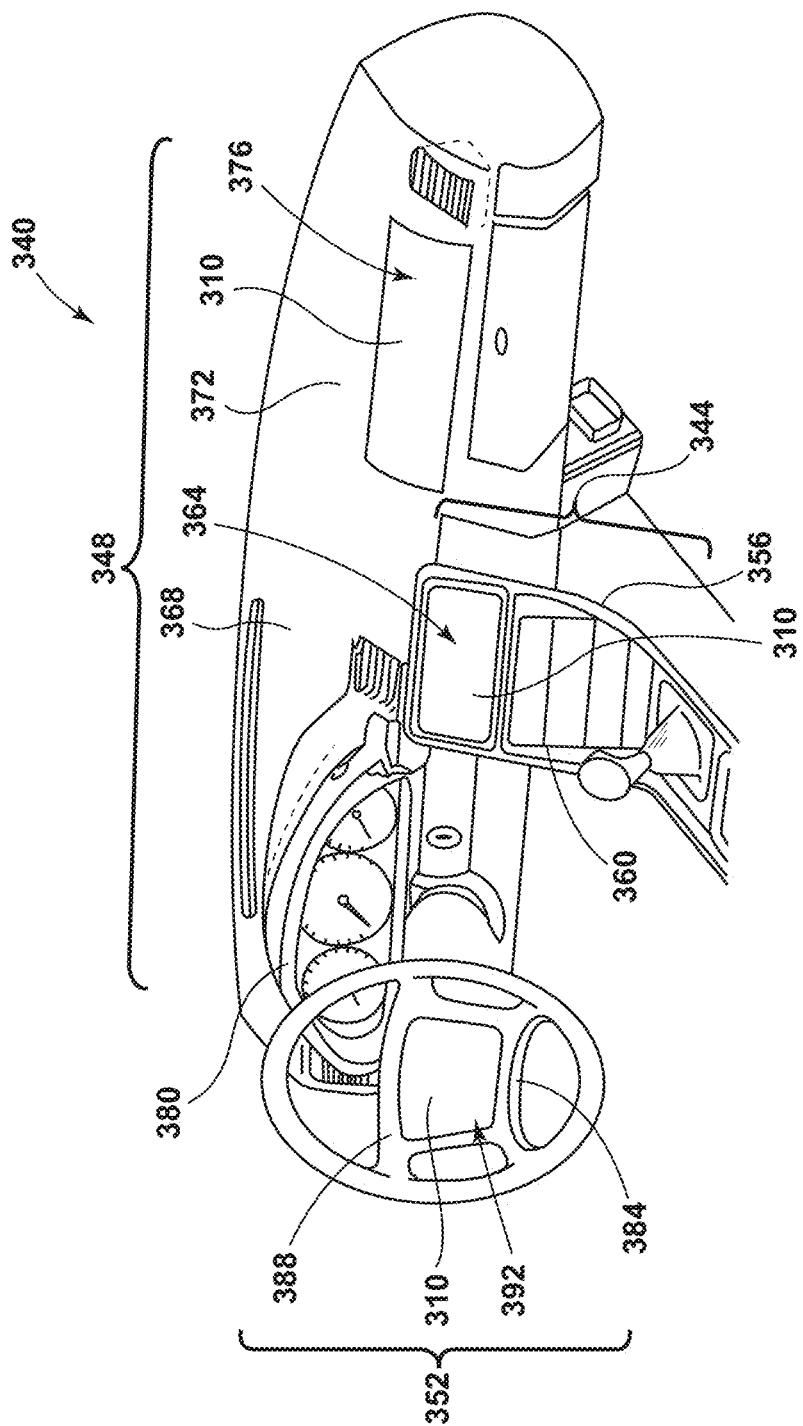
FIG. 3 is a perspective view of a vehicle interior with vehicular interior systems that may incorporate any of the articles disclosed herein.

According to some embodiments, the articles 100 (e.g., as shown in FIGS. 1-1C) may be incorporated within a vehicle interior with vehicular interior systems, as depicted in FIG. 3. More particularly, the article 100 may be used in conjunction with a variety of vehicle interior systems. A vehicle interior 340 is depicted that includes three different examples of a vehicle interior system 344, 348, 352. Vehicle interior system 344 includes a center console base 356 with a surface 360 including a display 364. Vehicle interior system 348 includes a dashboard base 368 with a surface 372 including a display 376. The dashboard base 368 typically includes an instrument panel 380 which may also include a display. Vehicle interior system 352 includes a dashboard steering wheel base 384 with a surface 388 and a display 392. In one or more examples, the vehicle interior system may include a base that is an armrest, a pillar, a seat back, a floor board, a headrest, a door panel, or any portion of the interior of a vehicle that includes a surface. It will be understood that the article 100 described herein can be used interchangeably in each of vehicle interior systems 344, 348 and 352.

According to some embodiments, the articles 100 (e.g., as shown in FIGS. 1-1C) may be used in a passive optical element, for example a lens, windows, lighting covers, eyeglasses, or sunglasses, that may or may not be integrated with an electronic display or electrically active device.

Referring again to FIG. 3, the displays 364, 376 and 392 may each include a housing having front, back, and side surfaces. At least one electrical component is at least partially within the housing. A display element is at or adjacent to the front surface of the housings. The article 100 (see FIGS. 1-1C) is disposed over the display elements. It will be understood that the article 100 may also be used on, or in conjunction with, the armrest, the pillar, the seat back, the floor board, the headrest, the door panel, or any portion of the interior of a vehicle that includes a surface, as explained above. According to various examples, the displays 364, 376 and 392 may be a vehicle visual display system or vehicle infotainment system. It will be understood that the article 100 may be incorporated in a variety of displays and structural components of autonomous vehicles and that the description provided herein with relation to conventional vehicles is not limiting.

EXAMPLES

Various embodiments will be further clarified by the following examples.

Example 1

The as-fabricated samples of Example 1 ("Ex. 1") were formed by providing a glass substrate having a nominal composition of 69 mol % $SiO_2$, 10 mol % $Al_2O_3$, 15 mol % $Na_2O$, and 5 mol % MgO and disposing an anti-reflective coating having five (5) layers on the glass substrate, as shown in FIG. 1A and Table 1 below. The anti-reflective coating (e.g., as consistent with the anti-reflective coatings 130 outlined in the disclosure) of each of the as-fabricated samples in this Example was deposited using a reactive sputtering process.

Samples of Example 1 were also modeled, and assumed to employ a glass substrate having the same composition of the glass substrate employed in the as-fabricated samples of this example. Further, the anti-reflective coating of each of the modeled samples was assumed to have the layer materials and physical thickness as shown in Table 1 below. The optical properties of this example, as outlined below in Tables 1A and 1B, were modeled or otherwise measured at near-normal incidence, unless otherwise noted.

As is evident from Tables 1-1B, Ex. 1 has a photopic average reflectance at near-normal incidence below 0.12% and even below 0.10% for certain angles. The color is well-controlled, with both a* and b* falling with a range of $-1<a*<1$ and $-3<b*<0$ at near normal incidence. The modeling example illustrates that color with changing incident angle stays within a range of $-1<a*<1$ and $-3<b*<2$ for all viewing angles within the range of 0 to 60 degrees. These color values for the modeled Ex. 1 correspond to a $\Delta C=sqrt((a_{max}-a_{min})^2+(b_{max}-b_{min})^2)$ value of $\Delta C<2.5$ for this same angular range of 0 to 60 degrees. This is a very tightly controlled range of color vs. changing incident angle for an anti-reflective (AR) coating with such low average reflectance. As with all experimental examples shown here, the optics of the experimental example can be fine-tuned to more closely match the modeling results with sufficient sputtering deposition recipe optimization.

TABLE 1

Anti-reflective coating attributes for Example 1

| Layer | Material | Refractive Index @550 nm | Extinction Coefficient @550 nm | Physical Thickness (nm) |
|---|---|---|---|---|
| Medium | Air | 1 | 0 | |
| 1 | $SiO_2$ | 1.44773 | 0 | 88.08 |
| 2 | $Nb_2O_5$ | 2.34534 | 0 | 113.23 |
| 3 | $SiO_2$ | 1.44773 | 0 | 37.95 |
| 4 | $Nb_2O_5$ | 2.34534 | 0 | 12.4 |
| 5 | $SiO_2$ | 1.44773 | 0 | 25 |
| Substrate | Glass | 1.51718 | 0 | 0.7 millimeters |
| Total Coating Thickness | | | | 276.66 |

TABLE 1A

Optical properties of modeled Example 1

| Incident Angle | Photopic average reflectance (Y) | L* | a* | b* |
|---|---|---|---|---|
| 0 | 0.1004 | 0.9067 | −0.2904 | −0.9431 |
| 5 | 0.0999 | 0.902 | −0.2759 | −0.8802 |
| 10 | 0.0996 | 0.8997 | −0.2341 | −0.6965 |
| 15 | 0.1037 | 0.9367 | −0.1711 | −0.4053 |
| 20 | 0.1192 | 1.0764 | −0.0999 | −0.0275 |
| 25 | 0.1566 | 1.4147 | −0.041 | 0.4071 |
| 30 | 0.2316 | 2.092 | −0.0188 | 0.8551 |
| 35 | 0.3672 | 3.3172 | −0.054 | 1.2511 |
| 40 | 0.5994 | 5.4145 | −0.155 | 1.501 |
| 45 | 0.9863 | 8.8765 | −0.2892 | 1.4257 |
| 50 | 1.6246 | 13.3793 | −0.3227 | 0.7068 |
| 55 | 2.6785 | 18.7074 | −0.2905 | 0.0134 |
| 60 | 4.4275 | 25.0373 | −0.1976 | −0.5852 |

TABLE 1B

Measured optical properties of Example 1

| Incident Angle | Photopic average reflectance (Y) | L* | a* | b* |
|---|---|---|---|---|
| 6 | 0.08 | 0.75 | 0.19 | −2.51 |

Example 2

The as-fabricated samples of Example 2 ("Ex. 2") were formed by providing a glass substrate having a nominal composition of 69 mol % $SiO_2$, 10 mol % $Al_2O_3$, 15 mol % $Na_2O$, and 5 mol % MgO and disposing an anti-reflective coating having five (5) layers on the glass substrate, as shown in FIG. 1A and Table 2 below. The anti-reflective coating (e.g., as consistent with the anti-reflective coatings 130 outlined in the disclosure) of each of the as-fabricated samples in this Example was deposited using a reactive sputtering process.

Samples of Example 2 were also modeled, and assumed to employ a glass substrate having the same composition of the glass substrate employed in the as-fabricated samples of this example. Further, the anti-reflective coating of each of the modeled samples was assumed to have the layer materials and physical thickness as shown in Table 2 below. The optical properties of this example, as outlined below in Tables 2A and 2B, were modeled or otherwise measured at near-normal incidence, unless otherwise noted.

As is evident from Tables 2-2B, Ex. 2 has a photopic average reflectance at near-normal incidence below 0.22% and even below 0.20% for certain angles. The color is well-controlled, with both a* and b* falling with a range of $-2<a*<0$ and $-3.5<b*<0$ at near normal incidence. The modeling example illustrates that color with changing incident angle stays within a range of $-2<a*<0$ and $-3.5<b*<0$ for all viewing angles within the range of 0 to 60 degrees. These color values for the modeled Ex. 2 correspond to a $\Delta C=\text{sqrt}((a_{max}-a_{min})^2+(b_{max}-b_{min})^2)$ value of $\Delta C<2.0$ for this same angular range of 0 to 60 degrees. This is a very tightly controlled range of color vs. changing incident angle for an anti-reflective (AR) coating with such low average reflectance. As with all experimental examples shown here, the optics of the experimental example can be fine-tuned to more closely match the modeling results with sufficient sputtering deposition recipe optimization.

TABLE 2

Anti-reflective coating attributes for Example 2

| Layer | Material | Refractive Index @550 nm | Extinction Coefficient @550 nm | Physical Thickness (nm) |
|---|---|---|---|---|
| Medium | Air | 1 | 0 | |
| 1 | $SiO_2$ | 1.44773 | 0 | 91.27 |
| 2 | $Nb_2O_5$ | 2.34534 | 0 | 114.04 |
| 3 | $SiO_2$ | 1.44773 | 0 | 40.29 |
| 4 | $Nb_2O_5$ | 2.34534 | 0 | 11.81 |
| 5 | $SiO_2$ | 1.44773 | 0 | 25 |
| Substrate | Glass | 1.51718 | 0 | 0.7 millimeters |
| Total Coating Thickness | | | | 282.42 |

TABLE 2A

Optical properties of modeled Example 2

| Incident Angle | Photopic average reflectance (Y) | L* | a* | b* |
|---|---|---|---|---|
| 0 | 0.2029 | 1.8331 | −1.2799 | −1.7398 |
| 5 | 0.1985 | 1.7933 | −1.2807 | −1.6782 |
| 10 | 0.1867 | 1.6864 | −1.2768 | −1.5045 |
| 15 | 0.1717 | 1.5507 | −1.254 | −1.2486 |
| 20 | 0.1608 | 1.4528 | −1.1989 | −0.9499 |
| 25 | 0.1653 | 1.493 | −1.1093 | −0.65 |
| 30 | 0.2012 | 1.817 | −0.999 | −0.391 |
| 35 | 0.2921 | 2.6389 | −0.8958 | −0.2247 |
| 40 | 0.4745 | 4.2857 | −0.8317 | −0.2255 |
| 45 | 0.8059 | 7.28 | −0.8299 | −0.5033 |
| 50 | 1.3825 | 11.8406 | −0.6668 | −0.8805 |
| 55 | 2.3666 | 17.3042 | −0.5153 | −1.2774 |
| 60 | 4.0365 | 23.7918 | −0.3807 | −1.6385 |

TABLE 2B

Measured optical properties of Example 2

| Incident Angle | Photopic average reflectance (Y) | L* | a* | b* |
|---|---|---|---|---|
| 6 | 0.15 | 1.33 | −1.93 | −3.26 |

Example 3

The as-fabricated samples of Example 3 ("Ex. 3") were formed by providing a glass substrate having a nominal composition of 69 mol % $SiO_2$, 10 mol % $Al_2O_3$, 15 mol % $Na_2O$, and 5 mol % MgO and disposing an anti-reflective coating having seven (7) layers on the glass substrate, as shown in FIG. 1A and Table 3 below. The anti-reflective coating (e.g., as consistent with the anti-reflective coatings 130 outlined in the disclosure) of each of the as-fabricated samples in this Example was deposited using a reactive sputtering process.

Samples of Example 3 were also modeled, and assumed to employ a glass substrate having the same composition of the glass substrate employed in the as-fabricated samples of this example. Further, the anti-reflective coating of each of the modeled samples was assumed to have the layer materials and physical thickness as shown in Table 3 below. The optical properties of this example, as outlined below in Tables 3A and 3B, were modeled or otherwise measured at near-normal incidence, unless otherwise noted.

As is evident from Tables 3-3B, Ex. 3 has a photopic average reflectance at near-normal incidence below 0.15% and even below 0.12% for certain angles. The color is well-controlled, with both a* and b* falling with a range of $0<a*<1.5$ and $-2<b*<0$ at near normal incidence. The modeling example illustrates that color with changing incident angle stays within a range of $-1<a*<1.5$ and $-2<b*<1$ for all viewing angles within the range of 0 to 60 degrees. These color values for the modeled Ex. 3 correspond to a $\Delta C=\text{sqrt}((a_{max}-a_{min})^2+(b_{max}31\ b_{min})^2)$ value of $\Delta C<2.1$ for this same angular range of 0 to 60 degrees. This is a very tightly controlled range of color vs. changing incident angle for an anti-reflective (AR) coating with such low average reflectance. As with all experimental examples shown here, the optics of the experimental example can be fine-tuned to more closely match the modeling results with sufficient sputtering deposition recipe optimization.

TABLE 3

Anti-reflective coating attributes for Example 3

| Layer | Material | Refractive Index @550 nm | Extinction Coefficient @550 nm | Thickness (nm) |
|---|---|---|---|---|
| Medium | Air | 1 | 0 | |
| 1 | $SiO_2$ | 1.44773 | 0 | 90.39 |
| 2 | $TiO_2$ | 2.49345 | 0.00264 | 35.02 |
| 3 | $SiO_2$ | 1.44773 | 0 | 8 |
| 4 | $TiO_2$ | 2.49345 | 0.00264 | 57.54 |
| 5 | $SiO_2$ | 1.44773 | 0 | 35.66 |
| 6 | $TiO_2$ | 2.49345 | 0.00264 | 12.81 |
| 7 | $SiO_2$ | 1.44773 | 0 | 25.7 |
| Substrate | Glass | 1.51718 | 0 | 0.7 millimeters |
| Total Coating Thickness | | | | 265.1 |

TABLE 3A

Optical properties of modeled Example 3

| Incident Angle | Photopic average reflectance (Y) | L* | a* | b* |
|---|---|---|---|---|
| 0 | 0.107 | 0.9669 | 0.0406 | −1.5922 |
| 5 | 0.1061 | 0.9581 | 0.0486 | −1.533 |
| 10 | 0.1045 | 0.944 | 0.0686 | −1.359 |
| 15 | 0.1065 | 0.9624 | 0.0892 | −1.0812 |
| 20 | 0.1194 | 1.0787 | 0.0934 | −0.7209 |
| 25 | 0.1541 | 1.3918 | 0.0634 | −0.3163 |
| 30 | 0.2266 | 2.0467 | −0.0108 | 0.0688 |
| 35 | 0.3608 | 3.2595 | −0.1234 | 0.3383 |
| 40 | 0.5939 | 5.3648 | −0.2495 | 0.3649 |
| 45 | 0.9854 | 8.8693 | −0.3256 | 0.0029 |

TABLE 3A-continued

Optical properties of modeled Example 3

| Incident Angle | Photopic average reflectance (Y) | L* | a* | b* |
|---|---|---|---|---|
| 50 | 1.6341 | 13.4363 | −0.2488 | −0.5866 |
| 55 | 2.7062 | 18.8266 | −0.1296 | −1.141 |
| 60 | 4.4836 | 25.2097 | 0.0074 | −1.5767 |

TABLE 3B

Measured optical properties of Example 3

| Incident Angle | Photopic average reflectance (Y) | L* | a* | b* |
|---|---|---|---|---|
| 6 | 0.08 | 0.74 | 1.24 | −0.54 |

Example 4

The as-fabricated samples of Example 4 ("Ex. 4") were formed by providing a glass substrate having a nominal composition of 69 mol % $SiO_2$, 10 mol % $Al_2O_3$, 15 mol % $Na_2O$, and 5 mol % MgO and disposing an anti-reflective coating having six (6) layers on the glass substrate, as shown in FIG. 1B and Table 4 below. The anti-reflective coating (e.g., as consistent with the anti-reflective coatings 130 outlined in the disclosure) of each of the as-fabricated samples in this Example was deposited using a reactive sputtering process.

Samples of Example 4 were also modeled, and assumed to employ a glass substrate having the same composition of the glass substrate employed in the as-fabricated samples of this example. Further, the anti-reflective coating of each of the modeled samples was assumed to have the layer materials and physical thickness as shown in Table 4 below. The optical properties of this example, as outlined below in Tables 4A and 4B, were modeled or otherwise measured at near-normal incidence, unless otherwise noted.

As is evident from Tables 4-4B, Ex. 4 has a photopic average reflectance at near-normal incidence below 0.25% and even below 0.21% for certain angles. The color is well-controlled, with both a* and b* falling with a range of −1<a*<2 and −4<b*<0 at near normal incidence. The modeling example illustrates that color with changing incident angle stays within a range of −2<a*<2 and −4<b*<1 for all viewing angles within the range of 0 to 60 degrees. These color values for the modeled Ex. 4 correspond to a ΔC=sqrt$((a_{max}-a_{min})^2+(b_{max}-b_{min})^2)$ value of ΔC<5 for this same angular range of 0 to 60 degrees. This is a very tightly controlled range of color vs. changing incident angle for an anti-reflective (AR) coating with such low average reflectance. As with all experimental examples shown here, the optics of the experimental example can be fine-tuned to more closely match the modeling results with sufficient sputtering deposition recipe optimization.

TABLE 4

Anti-reflective coating attributes for Example 4

| Layer | Material | Refractive Index @550 nm | Extinction Coefficient @550 nm | Thickness (nm) |
|---|---|---|---|---|
| Medium | Air | 1 | 0 | |
| 1 | $SiO_2$ | 1.44773 | 0 | 98.53 |
| 2 | $TiO_2$ | 2.49345 | 0.00264 | 14.37 |
| 3 | SiN | 2.05427 | 0.00145 | 106.90 |
| 4 | $SiO_2$ | 1.44773 | 0 | 43.31 |
| 5 | SiN | 2.05427 | 0.00145 | 12.91 |
| 6 | $SiO_2$ | 1.44773 | 0 | 25.00 |
| Substrate | Glass | 1.51718 | 0 | 0.7 millimeters |
| Total Coating Thickness | | | | 301.78 |

TABLE 4A

Optical properties of modeled Example 4

| Incident Angle | Photopic average reflectance (Y) | L* | a* | b* |
|---|---|---|---|---|
| 0 | 0.2072 | 1.8715 | 0.2659 | −3.4156 |
| 5 | 0.2056 | 1.8574 | 0.1918 | −3.254 |
| 10 | 0.2022 | 1.8267 | −0.0147 | −2.7965 |
| 15 | 0.2009 | 1.8148 | −0.31 | −2.1182 |
| 20 | 0.2086 | 1.8839 | −0.6349 | −1.3255 |
| 25 | 0.2356 | 2.1286 | −0.9298 | −0.5367 |
| 30 | 0.2975 | 2.6872 | −1.1463 | 0.131 |
| 35 | 0.4166 | 3.7635 | −1.2521 | 0.5635 |
| 40 | 0.6275 | 5.6685 | −1.2246 | 0.6385 |
| 45 | 0.985 | 8.8662 | −0.9724 | 0.1964 |
| 50 | 1.5802 | 13.1089 | −0.4265 | −0.6076 |
| 55 | 2.5681 | 18.2237 | 0.0511 | −1.4015 |
| 60 | 4.2171 | 24.3764 | 0.458 | −2.072 |

TABLE 4B

Measured optical properties of Example 4

| Incident Angle | Photopic average reflectance (Y) | L* | a* | b* |
|---|---|---|---|---|
| 6 | 0.36 | 3.27 | 1.83 | −1.87 |

Example 5

The as-fabricated samples of Example 5 ("Ex. 5") were formed by providing a glass substrate having a nominal composition of 69 mol % $SiO_2$, 10 mol % $Al_2O_3$, 15 mol % $Na_2O$, and 5 mol % MgO and disposing an anti-reflective coating having six (6) layers on the glass substrate, as shown in FIG. 1B and Table 5 below. The anti-reflective coating (e.g., as consistent with the anti-reflective coatings 130 outlined in the disclosure) of each of the as-fabricated samples in this Example was deposited using a reactive sputtering process.

Samples of Example 5 were also modeled, and assumed to employ a glass substrate having the same composition of the glass substrate employed in the as-fabricated samples of this example. Further, the anti-reflective coating of each of the modeled samples was assumed to have the layer materials and physical thickness as shown in Table 5 below. The optical properties of this example, as outlined below in Tables 5A and 5B, were modeled or otherwise measured at near-normal incidence, unless otherwise noted.

As is evident from Tables 5-5B, Ex. 5 has a photopic average reflectance at near-normal incidence below 0.15% and even below 0.10% for certain angles. The color is well-controlled, with both a* and b* falling with a range of 2<a*<3 and −5<b*<−2 at near normal incidence. The modeling example illustrates that color with changing incident angle stays within a range of −1<a*<3 and −3<b*<3 for all viewing angles within the range of 0 to 60 degrees. These color values for the modeled Ex. 5 correspond to a ΔC=sqrt $((a_{max}-a_{min})^2+(b_{max}-b_{min})^2)$ value of ΔC<7.5 for this same angular range of 0 to 60 degrees. This is a very tightly controlled range of color vs. changing incident angle for an anti-reflective (AR) coating with such low average reflectance. As with all experimental examples shown here, the optics of the experimental example can be fine-tuned to more closely match the modeling results with sufficient sputtering deposition recipe optimization.

TABLE 5

Anti-reflective coating attributes for Example 5

| Layer | Material | Refractive Index @550 nm | Extinction Coefficient @550 nm | Thickness (nm) |
|---|---|---|---|---|
| Medium | Air | 1 | 0 | |
| 1 | $SiO_2$ | 1.44773 | 0 | 97.61077 |
| 2 | $TiO_2$ | 2.49345 | 0.00264 | 15.45836 |
| 3 | SiN | 2.05427 | 0.00145 | 101.1361 |
| 4 | $SiO_2$ | 1.44773 | 0 | 39.26754 |
| 5 | SiN | 2.05427 | 0.00145 | 13.62717 |
| 6 | $SiO_2$ | 1.44773 | 0 | 25 |
| Substrate | Glass | 1.51718 | 0 | 0.7 millimeters |
| Total Coating Thickness | | | | 292.1 |

TABLE 5A

Optical properties of modeled Example 5

| Incident Angle | Photopic average reflectance (Y) | L* | a* | b* |
|---|---|---|---|---|
| 0 | 0.0991 | 0.8949 | 2.2865 | −4.6425 |
| 5 | 0.0986 | 0.8906 | 2.2604 | −4.4588 |
| 10 | 0.0985 | 0.8902 | 2.188 | −3.9252 |
| 15 | 0.1032 | 0.932 | 2.0854 | −3.0921 |
| 20 | 0.1198 | 1.0818 | 1.9757 | −2.0371 |
| 25 | 0.1591 | 1.4369 | 1.8848 | −0.8587 |
| 30 | 0.2365 | 2.136 | 1.8408 | 0.3281 |
| 35 | 0.3742 | 3.3803 | 1.8767 | 1.393 |
| 40 | 0.6061 | 5.4752 | 2.0368 | 2.1902 |
| 45 | 0.9864 | 8.8774 | 2.1774 | 2.5014 |
| 50 | 1.6054 | 13.2628 | 2.0035 | 1.6101 |
| 55 | 2.6181 | 18.4446 | 1.9588 | 0.6324 |
| 60 | 4.2934 | 24.6185 | 1.98 | −0.2445 |

TABLE 5B

Measured optical properties of Example 5

| Incident Angle | Photopic average reflectance (Y) | L* | a* | b* |
|---|---|---|---|---|
| 6 | 0.15 | 1.32 | 2.47 | −2.64 |

Example 6

The as-fabricated samples of Example 6 ("Ex. 6") were formed by providing a glass substrate having a nominal composition of 69 mol % $SiO_2$, 10 mol % $Al_2O_3$, 15 mol % $Na_2O$, and 5 mol % MgO and disposing an anti-reflective coating having eight (8) layers on the glass substrate, as shown in FIG. 1C and Table 6 below. The anti-reflective coating (e.g., as consistent with the anti-reflective coatings 130 outlined in the disclosure) of each of the as-fabricated samples in this Example was deposited using a reactive sputtering process.

Samples of Example 6 were also modeled, and assumed to employ a glass substrate having the same composition of the glass substrate employed in the as-fabricated samples of this example. Further, the anti-reflective coating of each of the modeled samples was assumed to have the layer materials and physical thickness as shown in Table 6 below. The optical properties of this example, as outlined below in Tables 6A and 6B, were modeled or otherwise measured at near-normal incidence, unless otherwise noted.

As is evident from Tables 6-6B, Ex. 6 has a photopic average reflectance at near-normal incidence below 0.35% and even below 0.32% for certain angles. The color is well-controlled, with both a* and b* falling with a range of −1<a*<5 and −6<b*<−3 at near normal incidence. The modeling example illustrates that color with changing incident angle stays within a range of −1<a*<5 and −6<b*<1 for all viewing angles within the range of 0 to 60 degrees. These color values for the modeled Ex. 6 correspond to a ΔC=sqrt $((a_{max}-a_{min})^2+(b_{max}-b_{min})^2)$ value of ΔC<7.0 for this same angular range of 0 to 60 degrees. This is a very tightly controlled range of color vs. changing incident angle for an anti-reflective (AR) coating with such low average reflectance. As with all experimental examples shown here, the optics of the experimental example can be fine-tuned to more closely match the modeling results with sufficient sputtering deposition recipe optimization.

TABLE 6

Anti-reflective coating attributes for Example 6

| Layer | Material | Refractive Index @550 nm | Extinction Coefficient @550 nm | Thickness (nm) |
|---|---|---|---|---|
| Medium | Air | 1 | 0 | |
| 1 | $SiO_2$ | 1.44773 | 0.00 | 94.7 |
| 2 | $TiO_2$ | 2.49345 | 0.00264 | 15.95 |
| 3 | SiN | 2.05427 | 0.00145 | 100.27 |
| 4 | $SiO_2$ | 1.44773 | 0.00 | 31.5 |
| 5 | SiN | 2.05427 | 0.00145 | 72.6 |
| 6 | $TiO_2$ | 2.49345 | 0.00264 | 43.15 |
| 7 | SiN | 2.05427 | 0.00145 | 60.5 |
| 8 | $SiO_2$ | 1.44773 | 0 | 25 |
| Substrate | Glass | 1.51718 | 0 | 0.7 millimeters |
| Total Coating Thickness | | | | 443.6 |

TABLE 6A

Optical properties of modeled Example 6

| Incident Angle | Photopic average reflectance (Y) | L* | a* | b* |
|---|---|---|---|---|
| 0 | 0.3102 | 2.8019 | −0.4915 | −3.4834 |
| 5 | 0.3082 | 2.7844 | −0.368 | −3.4029 |
| 10 | 0.3042 | 2.748 | −0.0295 | −3.1589 |
| 15 | 0.3033 | 2.7395 | 0.4345 | −2.7498 |
| 20 | 0.3136 | 2.8331 | 0.9018 | −2.1889 |
| 25 | 0.3464 | 3.1287 | 1.2647 | −1.5261 |
| 30 | 0.4158 | 3.7556 | 1.5001 | −0.8689 |
| 35 | 0.5418 | 4.894 | 1.7381 | −0.3801 |

TABLE 6A-continued

Optical properties of modeled Example 6

| Incident Angle | Photopic average reflectance (Y) | L* | a* | b* |
|---|---|---|---|---|
| 40 | 0.7554 | 6.8239 | 2.2887 | −0.2288 |
| 45 | 1.1093 | 9.8706 | 2.9999 | −0.407 |
| 50 | 1.6954 | 13.7999 | 3.782 | −0.5966 |
| 55 | 2.6748 | 18.6913 | 4.5149 | −0.4876 |
| 60 | 4.3262 | 24.7217 | 4.9104 | 0.0425 |

TABLE 6B

Measured optical properties of Example 6

| Incident Angle | Photopic average reflectance (Y) | L* | a* | b* |
|---|---|---|---|---|
| 6 | 0.19 | 1.73 | 4.80 | −5.00 |

Example 7

The as-fabricated samples of Example 7 ("Ex. 7") were formed by providing a glass substrate having a nominal composition of 69 mol % $SiO_2$, 10 mol % $Al_2O_3$, 15 mol % $Na_2O$, and 5 mol % MgO and disposing an anti-reflective coating having six (6) layers on the glass substrate, as shown in FIG. 1B and Table 7 below. The anti-reflective coating (e.g., as consistent with the anti-reflective coatings 130 outlined in the disclosure) of each of the as-fabricated samples in this Example was deposited using a reactive sputtering process.

Samples of Example 7 were also modeled, and assumed to employ a glass substrate having the same composition of the glass substrate employed in the as-fabricated samples of this example. Further, the anti-reflective coating of each of the modeled samples was assumed to have the layer materials and physical thickness as shown in Table 7 below. The optical properties of this example, as outlined below in Tables 7A and 7B, were modeled or otherwise measured at near-normal incidence, unless otherwise noted. In addition, transmittance data was modeled and measured for samples of Example 7. The modeled data included 1-sided transmittance values of 91.28%, 91.10%, 90.92%, 90.74%, and 90.57% at wavelengths of 930 nm, 935 nm, 940 nm, 945 nm, and 950 nm, respectively. The measured data included 1-sided transmittance values of 88.40%, 88.29%, 88.17%, 88.04%, 87.91% and 87.77% at wavelengths of 930 nm, 934 nm, 938 nm, 942 nm, 946 nm, and 950 nm, respectively.

As is evident from Tables 7-7B, Ex. 7 has a photopic average reflectance at near-normal incidence below 0.25%. The color is well-controlled, with both a* and b* falling with a range of 0<a*<2 and −6<b*<−2 at near normal incidence. The modeling example illustrates that color with changing incident angle stays within a range of −2<a*<2 and −6<b*<1 for all viewing angles within the range of 0 to 60 degrees. These color values for the modeled Ex. 7 correspond to a $\Delta C = \sqrt{(a_{max}-a_{min})^2 + (b_{max}-b_{min})^2}$ value of $\Delta C < 5.0$ for this same angular range of 0 to 60 degrees. This is a very tightly controlled range of color vs. changing incident angle for an anti-reflective (AR) coating with such low average reflectance. As with all experimental examples shown here, the optics of the experimental example can be fine-tuned to more closely match the modeling results with sufficient sputtering deposition recipe optimization.

TABLE 7

Anti-reflective coating attributes for Example 7

| Layer | Material | Refractive Index @550 nm | Extinction Coefficient @550 nm | Thickness (nm) |
|---|---|---|---|---|
| Medium | Air | 1 | 0 | |
| 1 | $SiO_2$ | 1.44773 | 0 | 96.72 |
| 2 | $Nb_2O_5$ | 2.34534 | 0 | 22.37 |
| 3 | SiN | 2.05427 | 0.00145 | 99.97 |
| 4 | $SiO_2$ | 1.44773 | 0 | 44.67 |
| 5 | SiN | 2.05427 | 0.00145 | 11.6 |
| 6 | $SiO_2$ | 1.44773 | 0 | 25 |
| Substrate | Glass | 1.50628 | 0 | 0.7 millimeters |
| Total Coating Thickness | | | | 300.33 |

TABLE 7A

Optical properties of modeled Example 7

| Incident Angle | Photopic average reflectance (Y) | L* | a* | b* |
|---|---|---|---|---|
| 0 | 0.199 | 1.798 | 0.4045 | −3.6503 |
| 5 | 0.1978 | 1.7868 | 0.3211 | −3.4763 |
| 10 | 0.1953 | 1.7639 | 0.0888 | −2.9839 |
| 15 | 0.1952 | 1.7633 | −0.243 | −2.2539 |
| 20 | 0.2042 | 1.8443 | −0.6059 | −1.4007 |
| 25 | 0.2323 | 2.0985 | −0.9284 | −0.5506 |
| 30 | 0.2947 | 2.6617 | −1.1502 | 0.1745 |
| 35 | 0.4137 | 3.7366 | −1.2283 | 0.6597 |
| 40 | 0.6239 | 5.6354 | −1.1326 | 0.787 |
| 45 | 0.9807 | 8.8293 | −0.7827 | 0.393 |
| 50 | 1.576 | 13.0832 | −0.1851 | −0.4236 |
| 55 | 2.5664 | 18.2161 | 0.3148 | −1.2319 |
| 60 | 4.2218 | 24.3917 | 0.7172 | −1.9184 |

TABLE 7B

Measured optical properties of Example 7

| Incident Angle | Photopic average reflectance (Y) | L* | a* | b* |
|---|---|---|---|---|
| 6 | 0.22 | 2.01 | 1.99 | −5.02 |

Example 8

The as-fabricated samples of Example 8 ("Ex. 8") were formed by providing a glass substrate having a nominal composition of 69 mol % $SiO_2$, 10 mol % $Al_2O_3$, 15 mol % $Na_2O$, and 5 mol % MgO and disposing an anti-reflective coating having five (5) layers on the glass substrate, as shown in FIG. 1A and Table 8 below. The anti-reflective coating (e.g., as consistent with the anti-reflective coatings 130 outlined in the disclosure) of each of the as-fabricated samples in this Example was deposited using a reactive sputtering process.

Samples of Example 8 were also modeled, and assumed to employ a glass substrate having the same composition of the glass substrate employed in the as-fabricated samples of this example. Further, the anti-reflective coating of each of the modeled samples was assumed to have the layer materials and physical thickness as shown in Table 8 below. The optical properties of this example, as outlined below in Tables 8A and 8B, were modeled or otherwise measured at near-normal incidence, unless otherwise noted.

As is evident from Tables 8-8B, Ex. 8 has a photopic average reflectance at near-normal incidence below 0.25%. The color is well-controlled, with both a* and b* falling with a range of 2<a*<4 and −5<b*<0 at near normal incidence. The modeling example illustrates that color with changing incident angle stays within a range of −2<a*<4 and −5<b*<2 for all viewing angles within the range of 0 to 60 degrees. These color values for the modeled Ex. 8 correspond to a $\Delta C = \mathrm{sqrt}((a_{max}-a_{min})^2+(b_{max}-b_{min})^2)$ value of $\Delta C<7.5$ for this same angular range of 0 to 60 degrees. This is a very tightly controlled range of color vs. changing incident angle for an anti-reflective (AR) coating with such low average reflectance. As with all experimental examples shown here, the optics of the experimental example can be fine-tuned to more closely match the modeling results with sufficient sputtering deposition recipe optimization.

TABLE 8

Anti-reflective coating attributes for Example 8

| Layer | Material | Refractive Index @550 nm | Extinction Coefficient @550 nm | Thickness (nm) |
|---|---|---|---|---|
| Medium | Air | 1 | 0 | |
| 1 | $SiO_2$ | 1.44773 | 0 | 86.14 |
| 2 | $TiO_2$ | 2.49345 | 0.00264 | 104.65 |
| 3 | $SiO_2$ | 1.44773 | 0 | 32.84 |
| 4 | $TiO_2$ | 2.49345 | 0.00264 | 12.16 |
| 5 | $SiO_2$ | 1.44773 | 0 | 25.7 |
| Substrate | Glass | 1.51718 | 0 | 0.7 millimeters |
| Total Coating Thickness | | | | 261.49 |

TABLE 8A

Optical properties of modeled Example 8

| Incident Angle | Photopic average reflectance (Y) | L* | a* | b* |
|---|---|---|---|---|
| 0 | 0.0998 | 0.9012 | 3.6423 | −4.2001 |
| 5 | 0.104 | 0.9397 | 3.5867 | −4.0521 |
| 10 | 0.1181 | 1.067 | 3.4169 | −3.6209 |
| 15 | 0.146 | 1.3188 | 3.1253 | −2.9456 |
| 20 | 0.1945 | 1.7566 | 2.7027 | −2.091 |
| 25 | 0.2737 | 2.4722 | 2.1438 | −1.1466 |
| 30 | 0.3986 | 3.6003 | 1.453 | −0.2232 |
| 35 | 0.5917 | 5.3445 | 0.6486 | 0.5539 |
| 40 | 0.8886 | 8.0264 | −0.2388 | 1.058 |
| 45 | 1.3477 | 11.6052 | −0.8918 | 0.9051 |
| 50 | 2.0672 | 15.836 | −1.2084 | 0.4652 |
| 55 | 3.2129 | 20.8773 | −1.2797 | −0.0446 |
| 60 | 5.0663 | 26.9227 | −1.1796 | −0.5095 |

TABLE 8B

Measured optical properties of Example 8

| Incident Angle | Photopic average reflectance (Y) | L* | a* | b* |
|---|---|---|---|---|
| 6 | 0.21 | 1.87 | 3.20 | −0.90 |

Comparative Example 1

The as-fabricated samples of Comparative Example 1 ("Comp. Ex. 1") were formed by providing a glass substrate having a nominal composition of 69 mol % $SiO_2$, 10 mol % $Al_2O_3$, 15 mol % $Na_2O$, and 5 mol % MgO and disposing an anti-reflective coating having five (5) layers on the glass substrate, as shown in Table 9 below. The anti-reflective coating the as-fabricated sample in this Comparative Example was deposited using a reactive sputtering process.

Samples of Comparative Example 1 were also modeled, and assumed to employ a glass substrate having the same composition of the glass substrate employed in the as-fabricated samples of this example. Further, the anti-reflective coating of each of the modeled samples was assumed to have the layer materials and physical thickness as shown in Table 9 below. The optical properties of this example, as outlined below in Table 9A, were modeled at near-normal incidence, unless otherwise noted.

TABLE 9

Anti-reflective coating attributes for Comparative Example 1

| Layer | Material | Refractive Index @550 nm | Extinction Coefficient @550 nm | Physical Thickness (nm) |
|---|---|---|---|---|
| Medium | Air | 1 | 0 | |
| 1 | $SiO_2$ | 1.47599 | 0 | 100.27 |
| 2 | $Nb_2O_5$ | 2.37406 | 0 | 32 |
| 3 | $SiO_2$ | 1.47599 | 0 | 29 |
| 4 | $Nb_2O_5$ | 2.37406 | 0 | 32 |
| 5 | $SiO_2$ | 1.47599 | 0 | 50.28 |
| 6 | $Nb_2O_5$ | 2.37406 | | 10.03 |
| 7 | $SiO_2$ | 1.47599 | | 25 |
| Substrate | Glass | 1.50694 | 0 | 0.7 millimeters |
| Total Coating Thickness | | | | 278.58 |

TABLE 9A

Optical properties of modeled Comparative Example 1

| Incident Angle | Photopic average reflectance (Y) | L* | a* | b* |
|---|---|---|---|---|
| 0 | 0.3079 | 2.7816 | −0.2891 | −2.2076 |
| 2 | 0.3077 | 2.7793 | −0.2825 | −2.1959 |
| 4 | 0.3069 | 2.7725 | −0.2632 | −2.1607 |
| 6 | 0.3058 | 2.7622 | −0.2316 | −2.1014 |
| 8 | 0.3044 | 2.7499 | −0.1888 | −2.0172 |
| 10 | 0.3031 | 2.7376 | −0.1362 | −1.9068 |
| 12 | 0.302 | 2.728 | −0.0754 | −1.7689 |
| 14 | 0.3016 | 2.7246 | −0.0085 | −1.6018 |
| 16 | 0.3024 | 2.7315 | 0.0622 | −1.4038 |
| 18 | 0.3049 | 2.7539 | 0.1344 | −1.1732 |
| 20 | 0.3097 | 2.7976 | 0.2057 | −0.9084 |
| 22 | 0.3177 | 2.8698 | 0.2738 | −0.6082 |
| 24 | 0.3298 | 2.9789 | 0.3368 | −0.272 |
| 26 | 0.347 | 3.1347 | 0.3933 | 0.1004 |
| 28 | 0.3707 | 3.3488 | 0.4422 | 0.508 |
| 30 | 0.4024 | 3.6352 | 0.4836 | 0.9494 |
| 32 | 0.444 | 4.0104 | 0.518 | 1.4218 |
| 34 | 0.4975 | 4.494 | 0.5469 | 1.9217 |
| 36 | 0.5657 | 5.1097 | 0.5728 | 2.4449 |
| 38 | 0.6516 | 5.8861 | 0.5986 | 2.9864 |
| 40 | 0.7592 | 6.8576 | 0.6279 | 3.5407 |
| 42 | 0.893 | 8.066 | 0.6572 | 4.102 |
| 44 | 1.0586 | 9.4706 | 0.6304 | 4.5066 |
| 46 | 1.263 | 11.0144 | 0.6122 | 4.5536 |
| 48 | 1.5146 | 12.7003 | 0.6028 | 4.4192 |
| 50 | 1.8235 | 14.5321 | 0.6015 | 4.2261 |
| 52 | 2.2023 | 16.515 | 0.6067 | 3.9918 |
| 54 | 2.6665 | 18.6556 | 0.617 | 3.731 |
| 56 | 3.235 | 20.9615 | 0.6305 | 3.4551 |
| 58 | 3.931 | 23.442 | 0.6455 | 3.1731 |
| 60 | 4.7831 | 26.1076 | 0.6604 | 2.8918 |

Figure 4:
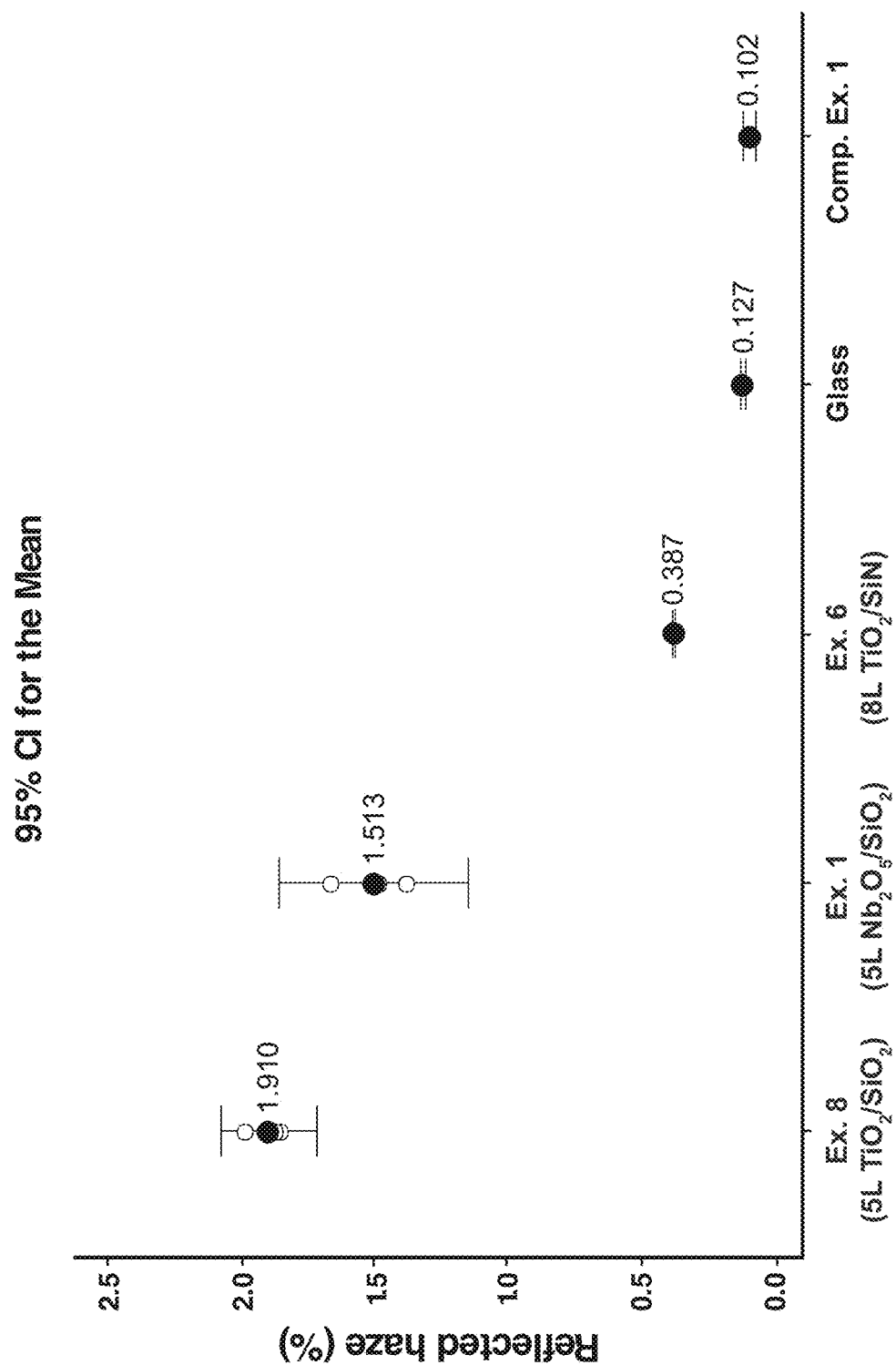
FIG. 4 is a plot of reflected haze for articles disclosed herein, as subjected to abrasion testing with a 350 g load for 500 abrading cycles with a Taber Abrader system.
Figure 4A:
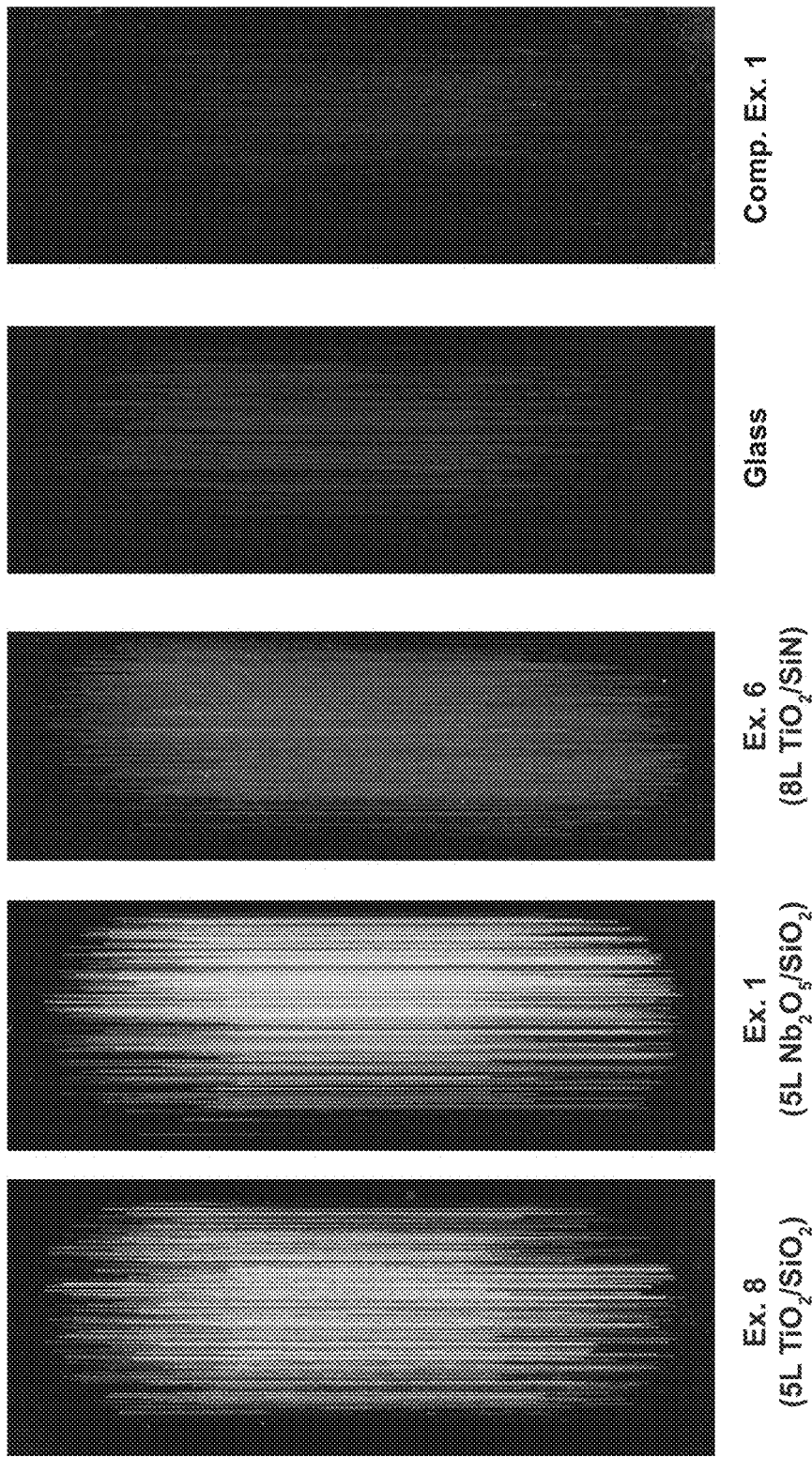
FIG. 4A provides digital camera scattered light images for the abraded samples of FIG. 4.
Figure 5:
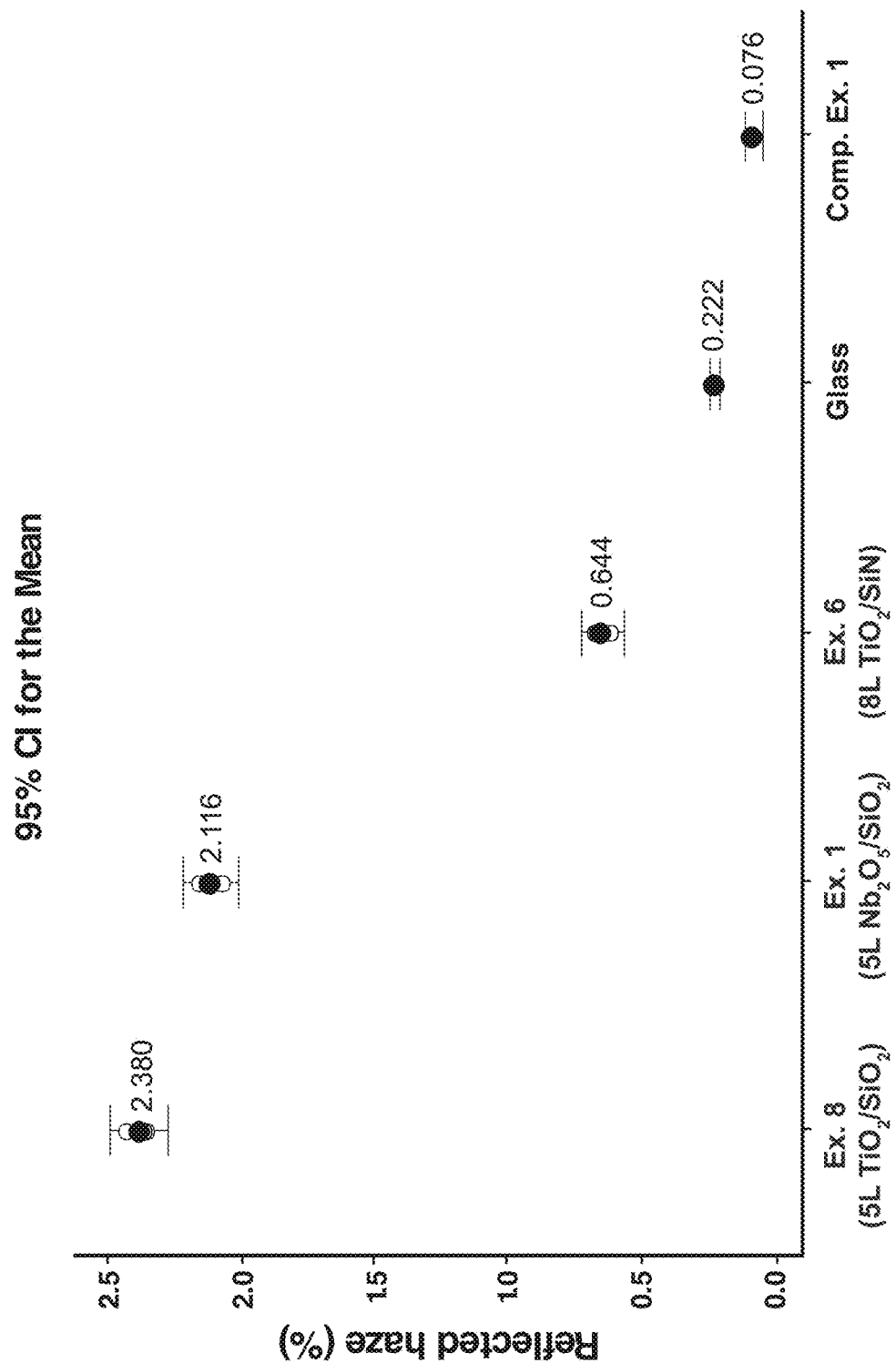
FIG. 5 is a plot of reflected haze for articles disclosed herein, as subjected to abrasion testing with a 350 g load for 1500 abrading cycles with a Taber Abrader system.
Figure 5A:
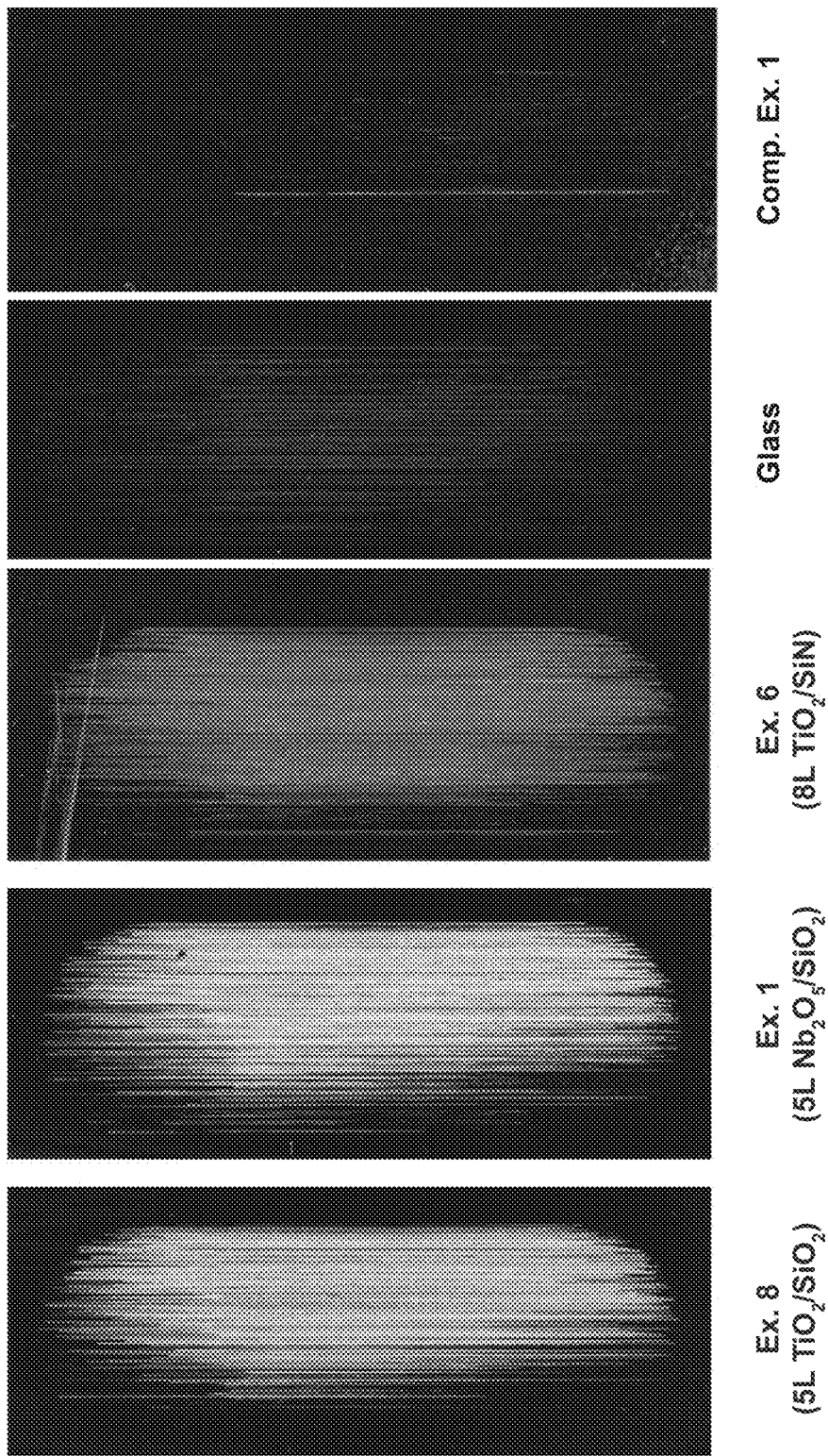
FIG. 5A provides digital camera scattered light images for the abraded samples of FIG. 5.

Referring now to FIGS. 4 and 5, a plot of specular component excluded (SCE) values is provided for samples of the prior Examples, specifically, Exs. 1, 6, 8, Comp. Ex.1 and a glass substrate control (i.e., with no anti-reflective coating) ("Glass"), as obtained from samples subjected to the Alumina SCE Test for 500 and 1500 cycles, respectively. Notably, it is evident from FIGS. 4 and 5, along with the scattered light images in FIGS. 4A and 5A, that the samples from Examples 1, 6 and 8 of the disclosure exhibited SCE values such that Ex. 6 (which includes and $SiN_x$ layer and higher hardness) has a higher abrasion resistance than Exs. 1 and 8 (which do not include a $SiN_x$ layer). In general, lower reflected haze values correspond to higher abrasion resistance and less visible abrasion. The control glass sample ("Glass") has the highest abrasion in this set, but this sample does not have an AR coating, and thus has a first surface reflectance of about 4%, as compared to the <0.25% first-surface reflectance values of all of the inventive sample.

Referring now to Table 10 below, experimentally measured Berkovich nanoindentation hardness values are provided for certain samples of the prior Examples. Hardness is reported both at 100 nm indentation depth and as a maximum (peak) hardness value for each stack. Maximum hardness may occur at different depths for each example, and typically depends on the total coating stack thickness. Notable values from those shown below include elastic modulus greater than 75 GPa, or greater than 80 GPa (e.g., Exs. 4-6). Further, these samples exhibit hardness values, at an indentation depth of 100 nm, greater than 7.0, or greater than 7.5 GPa. In addition, these samples exhibit maximum hardness values of greater than 7.0 GPa, or greater than 8.0 GPa.

TABLE 10

Mechanical properties of some of the prior Examples

| Example | Label | Thickness, nm | Elastic Modulus, GPa | Hardness @ 100 nm, GPa | Max. Hardness, Gpa |
|---|---|---|---|---|---|
| 2 | 5L $Nb_2O_5$/$SiO_2$ | 283 | 70 | 6.2 | 6.2 |
| 3 | 7L $TiO_2$/$SiO_2$ | 265 | 73 | 6.5 | 6.5 |
| 4 | 6L $TiO_2$/SiN/$SiO_2$ | 301 | 85.1 | 7.7 | 7.7 |
| 5 | 6L $TiO_2$/SiN/$SiO_2$ | 292 | 87.7 | 8.2 | 8.2 |
| 6 | 8L $TiO_2$/SiN/$SiO_2$ | 443 | 98.4 | 8.3 | 9.2 |
| 8 | 5L $TiO_2$/$SiO_2$ | 261 | 61 | 6.5 | 6.5 |

Many variations and modifications may be made to the above-described embodiments of the disclosure without departing substantially from the spirit and various principles of the disclosure. All such modifications and variations are intended to be included herein within the scope of this disclosure and protected by the following claims. For example, the various features of the disclosure may be combined according to the following embodiments.

According to a first aspect, an article comprises: a translucent substrate having a major surface; and an anti-reflective coating disposed on the major surface of the substrate and forming an anti-reflective surface, wherein the article exhibits a single side average photopic light reflectance at the anti-reflective surface of less than 0.35%, wherein the article exhibits a single side color shift ($\Delta C$) of less than 6 under an International Commission on Illumination illuminant over an incident angle range from 0 degrees to 60 degrees incidence at the anti-reflective surface, wherein $\Delta C=\sqrt{((a^*_{max}-a^*_{min})^2+(b_{max}-b^*_{min})^2)}$ with $a^*_{max}$, $a^*_{min}$, $b^*_{max}$, and $b^*_{min}$ as the maximum and minimum color coordinates in the (L*, a*, b*) colorimetery system for the respective a* and b* coordinates, wherein the anti-reflective coating comprises a physical thickness from about 50 nm to less than 500 nm, and further wherein the anti-reflective coating comprises a plurality of layers, the plurality of layers comprising at least one low refractive index layer and at least one high refractive index layer, wherein the at least one high refractive index layer has a refractive index of greater than 2.0 and the at least one low refractive index layer has a refractive index of less than 1.7.

According to a second aspect, the first aspect is provided, wherein the at least one high refractive index layer comprises one or more of $Nb_2O_5$, $TiO_2$, $Ta_2O_3$ and $HfO_2$.

According to a third aspect, either of the first or second aspects is provided, wherein the article exhibits single side color coordinates in the (L*, a*, b*) colorimetry system within the range of −2<a*<+1 and −4<b*<+1 under an International Commission on Illumination illuminant over an incident angle range from 0 degrees to 10 degrees at the anti-reflective surface.

According to a fourth aspect, any one of the first through third aspects is provided, wherein the article exhibits single side color coordinates in the (L*, a*, b*) colorimetry system within the range of −2<a*<+2 and −6<b*<+2 under an International Commission on Illumination illuminant over an incident angle range from 0 degrees to 60 degrees at the anti-reflective surface.

According to a fifth aspect, any one of the first through fourth aspects is provided, wherein the article exhibits a single side color shift ($\Delta C$) of less than 5 under an International Commission on Illumination illuminant over an incident angle range from 0 degrees to 60 degrees at the anti-reflective surface, wherein $\Delta C=\sqrt{((a^*_{max}-a^*_{min})^2+(b_{max}-b^*_{min})^2)}$ with $a^*_{max}$, $a^*_{min}$, $b^*_{max}$, and $b^*_{min}$ as the maximum and minimum color coordinates in the (L*, a*, b*) colorimetery system for the respective a* and b* coordinates.

According to a sixth aspect, any one of the first through fourth aspects is provided, wherein the article exhibits a single side color shift ($\Delta C$) of less than 2.5 under an International Commission on Illumination illuminant over an incident angle range from 0 degrees to 60 degrees at the anti-reflective surface, wherein $\Delta C=\sqrt{((a^*_{max}-a^*_{min})^2+(b^*_{max}-b^*_{min})^2)}$ with $a^*_{max}$, $a^*_{min}$, $b^*_{max}$, and $b^*_{min}$ as the maximum and minimum color coordinates in the (L*, a*, b*) colorimetery system for the respective a* and b* coordinates.

According to a seventh aspect, any one of the first through sixth aspects is provided, wherein the anti-reflective coating comprises a capping layer and a plurality of periods such that each period comprises an alternating low and high refractive index layer, wherein one of the low refractive index layers is in contact with the major surface of the substrate, and further wherein the capping layer comprises a low refractive index layer over the plurality of periods.

According to an eighth aspect, the seventh aspect is provided, wherein the plurality of periods is from 1 to 4 periods.

According to a ninth aspect, either of the seventh or eighth aspects is provided, wherein the at least one high refractive index layer comprises a total physical thickness of at least 100 nm.

According to a tenth aspect, any one of the seventh through ninth aspects is provided, wherein the at least one high refractive index layer that comprises a total physical thickness of at least 35% of the physical thickness of the anti-reflective coating.

According to an eleventh aspect, any one of the first through tenth aspects is provided, wherein the anti-reflective coating comprises a physical thickness from about 50 nm to less than 450 nm.

According to a twelfth aspect, any one of the seventh through eleventh aspects is provided, wherein each high refractive index layer is selected from the group consisting of $Nb_2O_5$, $TiO_2$, $Ta_2O_3$ and $HfO_2$, and each low refractive index layer comprises $SiO_2$.

According to a thirteenth aspect, any one of the first through tenth aspects is provided, wherein the article exhibits a single side average photopic light reflectance of less than 0.25%.

According to a fourteenth aspect, any one of the first through tenth aspects is provided, wherein the article exhibits a single side average photopic light reflectance of less than 0.15%.

According to a fifteenth aspect, an article comprises: a translucent substrate having a major surface; and an anti-reflective coating disposed on the major surface of the substrate and forming an anti-reflective surface, wherein the article exhibits a single side average photopic light reflectance at the anti-reflective surface of less than 0.5%, wherein the article exhibits a single side color shift ($\Delta C$) of less than 8 under an International Commission on Illumination illuminant over an incident angle range from 0 degrees to 60 degrees incidence at the anti-reflective surface, wherein $\Delta C = \sqrt{((a^*_{max} - a^*_{min})^2 + (b_{max} - b^*_{min})^2)}$ with $a^*_{max}$, $a^*_{min}$, $b^*_{max}$, and $b^*_{min}$ as the maximum and minimum color coordinates in the (L*, a*, b*) colorimetery system for the respective a* and b* coordinates, wherein the anti-reflective coating comprises a physical thickness from about 50 nm to less than 500 nm, wherein the anti-reflective coating comprises a maximum hardness of greater than 7 GPa as measured on the anti-reflective surface by a Berkovich Indenter Hardness Test along an indentation depth of about 100 nm and greater, and further wherein the anti-reflective coating comprises a plurality of layers, the plurality of layers comprising at least one low refractive index layer and at least one high refractive index layer, wherein the at least one high refractive index layer has a refractive index of greater than 2.0 and the at least one low refractive index layer has a refractive index of less than 1.7.

According to a sixteenth aspect, the fifteenth aspect is provided, wherein the at least one high refractive index layer comprises one or more of $SiN_x$, $AlO_xN_y$, $SiO_xN_y$, $SiAl_yO_xN_y$, $Nb_2O_5$, $TiO_2$, $Ta_2O_3$ and $HfO_2$.

According to a seventeenth aspect, either of the fifteenth or sixteenth aspects is provided, wherein the article exhibits single side color coordinates in the (L*, a*, b*) colorimetry system within the range of $-2 < a^* < +1$ and $-4 < b^* < +1$ under an International Commission on Illumination illuminant over an incident angle range from 0 degrees to 10 degrees at the anti-reflective surface.

According to an eighteenth aspect, any one of the fifteenth through seventeenth aspects is provided, wherein the article exhibits single side color coordinates in the (L*, a*, b*) colorimetry system within the range of $-2 < a^* < +2$ and $-6 < b^* < +2$ under an International Commission on Illumination illuminant over an incident angle range from 0 degrees to 60 degrees at the anti-reflective surface.

According to a nineteenth aspect, any one of the fifteenth through eighteenth aspects is provided, wherein the anti-reflective coating comprises a capping layer and a plurality of periods such that each period comprises an alternating low refractive index layer and at least one high refractive layer, wherein one of the low refractive index layers is in contact with the major surface of the substrate, and further wherein the capping layer comprises a low refractive index layer over the plurality of periods.

According to a twentieth aspect, the nineteenth aspect is provided, wherein the plurality of periods is from 1 to 4 periods.

According to a twenty-first aspect, either of the nineteenth or twentieth aspects is provided, wherein the at least one high refractive index layer comprises a total physical thickness of at least 100 nm.

According to a twenty-second aspect, any one of the nineteenth through twenty-first aspects is provided, wherein the at least one high refractive index layer comprises a total physical thickness of at least 40% of the physical thickness of the anti-reflective coating.

According to a twenty-third aspect, any one of the fifteenth through twenty-second aspects is provided, wherein the anti-reflective coating comprises a physical thickness from about 50 nm to less than 450 nm.

According to a twenty-fourth aspect, any one of the nineteenth through twenty-third aspects is provided, wherein each low refractive index layer comprises $SiO_2$, and further wherein at least one of the high refractive index layers comprises $SiN_x$, $AlO_xN_y$, $SiO_xN_y$, or $SiAl_yO_xN_y$.

According to a twenty-fifth aspect, the twenty-fourth aspect is provided, wherein at least one of the periods comprises an alternating low refractive index layer, a high refractive index layer selected from the group consisting of $Nb_2O_5$, $TiO_2$, $Ta_2O_3$ and $HfO_2$, and a high refractive index layer of SiNx or $AlO_xN_y$.

According to a twenty-sixth aspect, the twenty-fifth aspect is provided, wherein the article exhibits a single-side average transmittance of greater than 88% from 930 nm to 950 nm at a near-normal incidence of 8°.

According to a twenty-seventh aspect, any one of the fifteenth through twenty-sixth aspects is provided, wherein the anti-reflective coating comprises a maximum hardness of 8 GPa or greater as measured on the anti-reflective surface by a Berkovich Indenter Hardness Test along an indentation depth of about 100 nm and greater.

According to a twenty-eighth aspect, any one of the fifteenth through twenty-seventh aspects is provided, wherein the article exhibits a single side average photopic light reflectance of less than 0.35%.

According to a twenty-ninth aspect, any one of the fifteenth through twenty-seventh aspects is provided, wherein the article exhibits a single side average photopic light reflectance of less than 0.25%.

According to a thirtieth aspect, any one of the fifteenth through twenty-seventh aspects is provided, wherein the article exhibits a single side average photopic light reflectance of less than 0.15%.

According to a thirty-first aspect, a consumer electronic product is provided, comprising: a housing having a front surface, a back surface and side surfaces; electrical components provided at least partially within the housing, the electrical components including at least a controller, a memory, and a display, the display being provided at or adjacent the front surface of the housing; and a cover glass disposed over the display, wherein at least one of a portion of the housing or the cover glass comprises the article of any one of aspects 1-14.

According to a thirty-second aspect, a consumer electronic product is provided, comprising: a housing having a front surface, a back surface and side surfaces; electrical components provided at least partially within the housing, the electrical components including at least a controller, a memory, and a display, the display being provided at or adjacent the front surface of the housing; and a cover glass disposed over the display, wherein at least one of a portion of the housing or the cover glass comprises the article of any one of aspects 15-30.

What is claimed is:

1. An article, comprising:
a substrate having a major surface; and
an anti-reflective coating disposed on the major surface of the substrate and forming an anti-reflective surface,
wherein the article exhibits a single side average photopic light reflectance at the anti-reflective surface of less than 0.35%,
wherein the article exhibits a single side color shift ($\Delta C$) of less than 6 under an International Commission on Illumination illuminant over an incident angle range from 0 degrees to 60 degrees incidence at the anti-reflective surface, wherein $\Delta C = \sqrt{((a^*_{max} - a^*_{min})^2 + (b^*_{max} - b^*_{min})^2)}$ with $a^*_{max}$, $a^*_{min}$, $b^*_{max}$, and $b^*_{min}$ as the maximum and minimum color coordinates in the (L*, a*, b*) colorimetery system for the respective a* and b* coordinates,
wherein the anti-reflective coating comprises a physical thickness from about 50 nm to less than 450 nm,
wherein the anti-reflective coating comprises a plurality of layers,
wherein the anti-reflective coating comprises a capping layer and a plurality of periods such that each period comprises an alternating low refractive index layer and one or more high refractive index layers, wherein one of the low refractive index layers is in direct contact with the major surface of the substrate, wherein the capping layer comprises a low refractive index layer over the plurality of periods,
wherein at least one of the one or more high refractive index layers has a refractive index of greater than 2.0 and each low refractive index layer has a refractive index of less than 1.7,
wherein at least one of the plurality of periods comprises at least two high refractive index layers, the at least two high refractive index layers comprise a first layer comprising $SiN_x$ and a second layer comprising $Nb_2O_5$, $TiO_2$, $Ta_2O_3$, or $HfO_2$, and further wherein the first layer is thicker than the second layer, and
wherein a combined physical thickness of the high refractive index layers of the anti-reflective coating is about 40% or greater of a total physical thickness of the anti-reflective coating.

2. The article according to claim 1, wherein the article exhibits single side color coordinates in the (L*, a*, b*) colorimetry system within the range of $-2 < a^* < +1$ and $-4 < b^* < +1$ under an International Commission on Illumination illuminant over an incident angle range from 0 degrees to 10 degrees at the anti-reflective surface.

3. The article according to claim 1, wherein the article exhibits single side color coordinates in the (L*, a*, b*) colorimetry system within the range of $-2 < a^* < +2$ and $-6 < b^* < +2$ under an International Commission on Illumination illuminant over an incident angle range from 0 degrees to 60 degrees at the anti-reflective surface.

4. The article according to claim 1, wherein the article exhibits a single side color shift ($\Delta C$) of less than 5 under an International Commission on Illumination illuminant over an incident angle range from 0 degrees to 60 degrees at the anti-reflective surface, wherein $\Delta C = \sqrt{((a^*_{max} - a^*_{min})^2 + (b^*_{max} - b^*_{min})^2)}$ with $a^*_{max}$, $a^*_{min}$, $b^*_{max}$, and $b^*_{min}$ as the maximum and minimum color coordinates in the (L*, a*, b*) colorimetery system for the respective a* and b* coordinates.

5. The article according to claim 1, wherein the article exhibits a single side color shift ($\Delta C$) of less than 2.5 under an International Commission on Illumination illuminant over an incident angle range from 0 degrees to 60 degrees at the anti-reflective surface, wherein $\Delta C = \sqrt{((a^*_{max} - a^*_{min})^2 + (b^*_{max} - b^*_{min})^2)}$ with $a^*_{max}$, $a^*_{min}$, $b^*_{max}$, and $b^*_{min}$ as the maximum and minimum color coordinates in the (L*, a*, b*) colorimetery system for the respective a* and b* coordinates.

6. The article according to claim 1, wherein the article exhibits a single side average photopic light reflectance of less than 0.25%.

7. The article according to claim 1, wherein the article exhibits a single side average photopic light reflectance of less than 0.15%.

8. The article according to claim 1, wherein the substrate is a translucent substrate.

9. The article according to claim 1, wherein the substrate is a transparent substrate.

10. A consumer electronic product, comprising:
a housing having a front surface, a back surface and side surfaces;
electrical components provided at least partially within the housing, the electrical components including at least a controller, a memory, and a display, the display being provided at or adjacent the front surface of the housing; and
a cover glass disposed over the display, wherein at least one of a portion of the housing or the cover glass comprises the article of claim 1.

11. An article, comprising:
a substrate having a major surface; and
an anti-reflective coating disposed on the major surface of the substrate and forming an anti-reflective surface,
wherein the article exhibits a single side average photopic light reflectance at the anti-reflective surface of less than 0.5%,
wherein the article exhibits a single side color shift ($\Delta C$) of less than 8 under an International Commission on Illumination illuminant over an incident angle range from 0 degrees to 60 degrees incidence at the anti-reflective surface, wherein $\Delta C = \sqrt{((a^*_{max} - a^*_{min})^2 + (b^*_{max} - b^*_{min})^2)}$ with $a^*_{max}$, $a^*_{min}$, $b^*_{max}$, and $b^*_{min}$ as the maximum and minimum color coordinates in the (L*, a*, b*) colorimetery system for the respective a* and b* coordinates,
wherein the anti-reflective coating comprises a physical thickness from about 50 nm to less than 450 nm,
wherein the anti-reflective coating comprises a maximum hardness of greater than 7 GPa as measured on the anti-reflective surface by a Berkovich Indenter Hardness Test along an indentation depth of about 100 nm and greater,
wherein the anti-reflective coating comprises a plurality of layers,
wherein the anti-reflective coating comprises a capping layer and a plurality of periods such that each period comprises an alternating low refractive index layer and one or more high refractive index layers, wherein one of the low refractive index layers is in direct contact with the major surface of the substrate, wherein the capping layer comprises a low refractive index layer over the plurality of periods, wherein at least one of the one or more high refractive index layers has a refractive index of greater than 2.0 and each low refractive index layer has a refractive index of less than 1.7, wherein at least one of the plurality of periods comprises at least two high refractive index layers, the at least two high refractive index layers comprise a first layer comprising $SiN_x$ and a second layer comprising $Nb_2O_5$, $TiO_2$, $Ta_2O_3$, or $HfO_2$, and further wherein the first layer is thicker than the second layer, and wherein a combined physical thickness of the high refractive index layers of the anti-reflective coating is about 40% or greater of a total physical thickness of the anti-reflective coating.

12. The article according to claim 11, wherein the article exhibits single side color coordinates in the (L*, a*, b*) colorimetry system within the range of −2<a*<+1 and −4<b*<+1 under an International Commission on Illumination illuminant over an incident angle range from 0 degrees to 10 degrees at the anti-reflective surface.

13. The article according to claim 11, wherein the article exhibits single side color coordinates in the (L*, a*, b*) colorimetry system within the range of −2<a*<+2 and −6<b*<+2 under an International Commission on Illumination illuminant over an incident angle range from 0 degrees to 60 degrees at the anti-reflective surface.

14. The article according to claim 11, wherein the anti-reflective coating comprises a maximum hardness of 8 GPa or greater as measured on the anti-reflective surface by a Berkovich Indenter Hardness Test along an indentation depth of about 100 nm and greater.

15. The article according to claim 11, wherein the article exhibits a single side average photopic light reflectance of less than 0.35%.

16. The article according to claim 11, wherein the article exhibits a single side average photopic light reflectance of less than 0.25%.

17. The article according to claim 11, wherein the article exhibits a single side average photopic light reflectance of less than 0.15%.

18. A consumer electronic product, comprising:
a housing having a front surface, a back surface and side surfaces;
electrical components provided at least partially within the housing, the electrical components including at least a controller, a memory, and a display, the display being provided at or adjacent the front surface of the housing; and
a cover glass disposed over the display, wherein at least one of a portion of the housing or the cover glass comprises the article of claim 11.

19. An article, comprising:
a substrate having a major surface; and
an anti-reflective coating disposed on the major surface of the substrate and forming an anti-reflective surface,
wherein the article exhibits a single side average photopic light reflectance at the anti-reflective surface of less than 0.5%,
wherein the anti-reflective coating comprises a physical thickness from about 50 nm to less than 500 nm,
wherein the anti-reflective coating comprises a maximum hardness of greater than 7 GPa as measured on the anti-reflective surface by a Berkovich Indenter Hardness Test along an indentation depth of about 100 nm and greater,
wherein the anti-reflective coating comprises a plurality of layers,
wherein the anti-reflective coating comprises a capping layer and a plurality of periods such that each period comprises an alternating low refractive index layer and one or more high refractive index layers, wherein one of the low refractive index layers is in direct contact with the major surface of the substrate, and wherein the capping layer comprises a low refractive index layer over the plurality of periods,
wherein at least one of the plurality of periods comprises at least two high refractive index layers, each of the at least two high refractive index layers comprising $Nb_2O_5$, $TiO_2$, $Ta_2O_3$, $HfO_2$, or $SiN_x$,
wherein at least one of the one or more high refractive index layers has a refractive index of greater than 2.0 and each low refractive index layer has a refractive index of less than 1.7,
wherein the at least two high refractive index layers comprise a first layer comprising $SiN_x$ and a second layer comprising $Nb_2O_5$, $TiO_2$, $Ta_2O_3$, or $HfO_2$, and further wherein the first layer is thicker than the second layer, and
wherein a combined physical thickness of the high refractive index layers of the anti-reflective coating is about 40% or greater of a total physical thickness of the anti-reflective coating.

20. The article according to claim 19, wherein the article further exhibits a reflected haze of less than 2% after being subjected to 500 abrasion cycles with a 350 g load in the Alumina SCE Test or less than 2.5% after being subjected to 1500 abrasion cycles with a 350 g load in the Alumina SCE Test.

21. The article according to claim 19, wherein the anti-reflective coating comprises a maximum hardness of greater than 8 GPa as measured on the anti-reflective surface by a Berkovich Indenter Hardness Test along an indentation depth of about 100 nm and greater.

22. The article according to claim 19, wherein the article exhibits a single side average photopic light reflectance of less than 0.25%.

* * * * *

UNITED STATES PATENT AND TRADEMARK OFFICE
CERTIFICATE OF CORRECTION

PATENT NO.         : 11,815,657 B2
APPLICATION NO.    : 16/944408
DATED              : November 14, 2023
INVENTOR(S)        : Shandon Dee Hart et al.

Page 1 of 1

It is certified that error appears in the above-identified patent and that said Letters Patent is hereby corrected as shown below:

In the Specification

In Column 2, Line 36, after b*), delete "colorimetery" and insert -- colorimetry --.

In Column 2, Line 58, after b*), delete "colorimetery" and insert -- colorimetry --.

In Column 10, Line 31, after b*, delete "colorimetery" and insert -- colorimetry --.

In Column 12, Line 6, after b*), delete "colorimetery" and insert -- colorimetry --.

In Column 42, Line 3, after b*), delete "colorimetery" and insert -- colorimetry --.

In Column 42, Line 39, after b*), delete "colorimetery" and insert -- colorimetry --.

In Column 42, Line 49, after b*), delete "colorimetery" and insert -- colorimetry --.

In the Claims

In Column 45, Line 24, in Claim 1, delete "colorimetery" and insert -- colorimetry --.

In Column 46, Line 4, in Claim 4, delete "colorimetery" and insert -- colorimetry --.

In Column 46, Line 14, in Claim 5, delete "colorimetery" and insert -- colorimetry --.

In Column 46, Line 51, in Claim 11, delete "colorimetery" and insert -- colorimetry --.

Signed and Sealed this
Eighteenth Day of November, 2025

John A. Squires
*Director of the United States Patent and Trademark Office*